(12) United States Patent
Schumacher et al.

(10) Patent No.: US 12,072,193 B2
(45) Date of Patent: Aug. 27, 2024

(54) METHODS AND SYSTEMS FOR NOTIFYING AND MITIGATING A SUBOPTIMAL EVENT OCCURRING IN A TRANSPORT CLIMATE CONTROL SYSTEM

(71) Applicant: THERMO KING LLC, Minneapolis, MN (US)

(72) Inventors: Ryan Wayne Schumacher, Bloomington, MN (US); Mark D. Leasure, Eagan, MN (US); Casey Briscoe, Minnetonka, MN (US); Matthew Srnec, Minnetonka, MN (US); Philip Lewis Lavrich, Mooresville, NC (US); Panayu Robert Srichai, Minneapolis, MN (US); Wallace Stephen Hubbard, Chanhassen, MN (US); Grant A. Baumgardner, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 494 days.

(21) Appl. No.: 17/420,032

(22) PCT Filed: Dec. 31, 2018

(86) PCT No.: PCT/US2018/068129
§ 371 (c)(1),
(2) Date: Jun. 30, 2021

(87) PCT Pub. No.: WO2020/142061
PCT Pub. Date: Jul. 9, 2020

(65) Prior Publication Data
US 2022/0090924 A1 Mar. 24, 2022

(51) Int. Cl.
*G01C 21/34* (2006.01)
*B60H 1/00* (2006.01)
(Continued)

(52) U.S. Cl.
CPC ..... *G01C 21/3415* (2013.01); *B60H 1/00428* (2013.01); *B60H 1/3205* (2013.01);
(Continued)

(58) Field of Classification Search
CPC ............ G01C 21/3415; B60H 1/00428; B60H 1/3205; B60H 1/3225; B60H 1/3232; B60H 2001/3266; G07C 5/0825; Y02T 10/88
(Continued)

(56) References Cited

U.S. PATENT DOCUMENTS

| | | |
|---|---|---|
| 3,875,483 A | 4/1975 | Farr |
| 5,104,037 A | 4/1992 | Karg et al. |

(Continued)

FOREIGN PATENT DOCUMENTS

| | | |
|---|---|---|
| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.
(Continued)

*Primary Examiner* — Muhammad Shafi
(74) *Attorney, Agent, or Firm* — HSML P.C.

(57) ABSTRACT

A method for notifying and mitigating a suboptimal event occurring in a transport climate control system that provides climate control to a climate controlled space of a transport unit is provided. The method includes monitoring an amount of power available for powering the transport climate control system, monitoring a power demand from the transport climate control system, and accessing operational data of the
(Continued)

transport climate control system and the transport unit. The method also includes a controller determining whether a suboptimal event is detected based on one or more of the monitored amount of power available, the monitored power demand and the accessed operational data. Also, the method includes the controller generating a notification when a suboptimal event is detected, and the controller instructing the generated notification to be displayed on a display.

17 Claims, 8 Drawing Sheets

(51) Int. Cl.
 *B60H 1/32* (2006.01)
 *G07C 5/08* (2006.01)
(52) U.S. Cl.
 CPC ......... *B60H 1/3225* (2013.01); *B60H 1/3232* (2013.01); *G07C 5/0825* (2013.01)
(58) Field of Classification Search
 USPC ....................................................... 701/34.2
 See application file for complete search history.

(56) References Cited

U.S. PATENT DOCUMENTS

| | | | |
|---|---|---|---|
| 5,231,849 A | 8/1993 | Rosenblatt |
| 6,034,445 A | 3/2000 | Hewitt |
| 6,280,320 B1 | 8/2001 | Paschke et al. |
| 6,487,869 B1 | 12/2002 | Sulc et al. |
| 6,518,727 B2 | 2/2003 | Oomura et al. |
| 6,560,980 B2 | 5/2003 | Gustafson et al. |
| 6,600,237 B1 | 7/2003 | Meissner |
| 6,631,080 B2 | 10/2003 | Trimble et al. |
| 6,652,330 B1 | 11/2003 | Wasilewski |
| 6,700,214 B2 | 3/2004 | Ulinski et al. |
| 6,753,692 B2 | 6/2004 | Toyomura et al. |
| 6,925,826 B2 | 8/2005 | Hille et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 8,020,651 B2 | 9/2011 | Zillmer et al. |
| 8,030,880 B2 | 10/2011 | Alston et al. |
| 8,134,339 B2 | 3/2012 | Burlak et al. |
| 8,170,886 B2 | 5/2012 | Luff |
| 8,214,141 B2 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabec |
| 8,476,872 B2 | 7/2013 | Truckenbrod et al. |
| 8,487,458 B2 | 7/2013 | Steele et al. |
| 8,541,905 B2 | 9/2013 | Brabec |
| 8,602,141 B2 | 12/2013 | Yee et al. |
| 8,626,367 B2 | 1/2014 | Krueger et al. |
| 8,626,419 B2 | 1/2014 | Mitchell et al. |
| 8,643,216 B2 | 2/2014 | Lattin |
| 8,643,217 B2 | 2/2014 | Gietzold et al. |
| 8,670,225 B2 | 3/2014 | Nunes |
| 8,723,344 B1 | 5/2014 | Dierickx |
| 8,742,620 B1 | 6/2014 | Brennan et al. |
| 8,760,115 B2 | 6/2014 | Kinser et al. |
| 8,764,469 B2 | 7/2014 | Lamb |
| 8,767,379 B2 | 7/2014 | Whitaker |
| 8,818,588 B2 | 8/2014 | Ambrosio et al. |
| 8,862,356 B2 | 10/2014 | Miller |
| 8,912,683 B2 | 12/2014 | Dames et al. |
| 8,924,057 B2 | 12/2014 | Kinser et al. |
| 8,978,798 B2 | 5/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabec |
| 9,147,335 B2 | 9/2015 | Raghunathan et al. |
| 9,199,543 B2 | 12/2015 | Okamoto et al. |
| 9,313,616 B2 | 4/2016 | Mitchell et al. |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kundasamy |
| 9,694,697 B2 | 7/2017 | Brabec |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,802,482 B2 | 10/2017 | Schumacher et al. |
| 9,825,549 B2 | 11/2017 | Choi et al. |
| 9,846,086 B1 | 12/2017 | Robinson et al. |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,230,236 B2 | 3/2019 | Schumacher et al. |
| 10,240,847 B1 | 3/2019 | Thomas, Jr. |
| 10,427,537 B2 | 10/2019 | Symanow et al. |
| 10,875,497 B2 | 12/2020 | Srnec |
| 10,995,760 B1 | 5/2021 | Stubbs |
| 11,034,213 B2 | 6/2021 | Wenger et al. |
| 2001/0025349 A1 | 9/2001 | Sharood et al. |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2003/0201097 A1 | 10/2003 | Zeigler et al. |
| 2004/0168455 A1 | 9/2004 | Nakamura |
| 2005/0057210 A1 | 3/2005 | Ueda et al. |
| 2005/0065684 A1 | 3/2005 | Larson et al. |
| 2005/0285445 A1 | 12/2005 | Wruck et al. |
| 2006/0284601 A1 | 12/2006 | Salasoo et al. |
| 2007/0052241 A1 | 3/2007 | Pacy |
| 2007/0192116 A1 | 8/2007 | Levitt |
| 2008/0147270 A1 | 6/2008 | Sakane et al. |
| 2008/0177678 A1 | 7/2008 | Di Martini et al. |
| 2008/0281473 A1 | 11/2008 | Pitt |
| 2009/0121798 A1 | 5/2009 | Levinson |
| 2009/0122901 A1 | 5/2009 | Choi et al. |
| 2009/0126901 A1 | 5/2009 | Hegar et al. |
| 2009/0178424 A1 | 7/2009 | Hwang et al. |
| 2009/0195349 A1 | 8/2009 | Frader-Thompson et al. |
| 2009/0228155 A1 | 9/2009 | Slifkin et al. |
| 2009/0229288 A1* | 9/2009 | Alston ............... B60H 1/00428 62/239 |
| 2009/0314019 A1 | 12/2009 | Fujimoto et al. |
| 2009/0320515 A1 | 12/2009 | Bischofberger et al. |
| 2010/0045105 A1 | 2/2010 | Bovio et al. |
| 2010/0089669 A1 | 4/2010 | Taguch |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0118916 A1 | 5/2011 | Gullichsen |
| 2011/0162395 A1 | 7/2011 | Chakiachvili et al. |
| 2011/0208378 A1 | 8/2011 | Krueger et al. |

(56) References Cited

U.S. PATENT DOCUMENTS

| | | |
|---|---|---|
| 2011/0224841 A1 | 9/2011 | Profitt-Brown et al. |
| 2011/0241420 A1 | 10/2011 | Hering et al. |
| 2011/0265506 A1 | 11/2011 | Alston |
| 2011/0290893 A1 | 12/2011 | Steinberg |
| 2012/0000212 A1 | 1/2012 | Sanders et al. |
| 2012/0116931 A1 | 5/2012 | Meyers |
| 2012/0153722 A1 | 6/2012 | Nazarian |
| 2012/0198866 A1 | 8/2012 | Zeidner |
| 2012/0245772 A1 | 9/2012 | King |
| 2012/0310376 A1 | 12/2012 | Krumm et al. |
| 2012/0310416 A1 | 12/2012 | Tepper et al. |
| 2013/0000342 A1 | 1/2013 | Blasko et al. |
| 2013/0073094 A1 | 3/2013 | Knapton et al. |
| 2013/0088900 A1 | 4/2013 | Park |
| 2013/0158828 A1 | 6/2013 | McAlister |
| 2013/0175975 A1 | 7/2013 | Shinozaki |
| 2013/0197730 A1 | 8/2013 | Huntzicker |
| 2013/0197748 A1 | 8/2013 | Whitaker |
| 2013/0231808 A1 | 9/2013 | Flath et al. |
| 2014/0018969 A1 | 1/2014 | Forbes, Jr. |
| 2014/0020414 A1 | 1/2014 | Rusignuolo et al. |
| 2014/0026599 A1 | 1/2014 | Rusignuolo et al. |
| 2014/0060097 A1 | 3/2014 | Perreault |
| 2014/0137590 A1 | 5/2014 | Chopko et al. |
| 2014/0203760 A1 | 7/2014 | Lammers |
| 2014/0230470 A1 | 8/2014 | Cook |
| 2014/0265560 A1 | 9/2014 | Leehey et al. |
| 2014/0283533 A1 | 9/2014 | Kurtzman et al. |
| 2014/0335711 A1 | 11/2014 | Lamb |
| 2014/0343741 A1 | 11/2014 | Clarke |
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0246593 A1 | 9/2015 | Larson et al. |
| 2015/0306937 A1 | 10/2015 | Kitamura et al. |
| 2015/0316301 A1 | 11/2015 | Kolda et al. |
| 2015/0344044 A1 | 12/2015 | Yuasa |
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0156258 A1 | 6/2016 | Yokoyama |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0107910 A1 | 4/2017 | Huang |
| 2017/0190263 A1 | 7/2017 | Enzinger et al. |
| 2017/0210194 A1 | 7/2017 | Ling |
| 2017/0217280 A1 | 8/2017 | Larson et al. |
| 2017/0219374 A1 | 8/2017 | Sitarski et al. |
| 2017/0237355 A1 | 8/2017 | Stieneker et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0170349 A1 | 6/2018 | Jobson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0238698 A1 | 8/2018 | Pedersen |
| 2018/0306533 A1 | 10/2018 | Alahyari et al. |
| 2018/0326813 A1 | 11/2018 | Ganiere |
| 2018/0334012 A1 | 11/2018 | Geller et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo et al. |
| 2019/0047496 A1 | 2/2019 | Sufrin-Disler et al. |
| 2019/0081489 A1 | 3/2019 | Gerber et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0277561 A1 | 9/2019 | Spath |
| 2019/0277647 A1 | 9/2019 | Adetola et al. |
| 2019/0283536 A1 | 9/2019 | Suzuki et al. |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0106271 A1 | 4/2020 | Rydkin et al. |
| 2020/0130471 A1 | 4/2020 | Leasure |
| 2020/0130473 A1 | 4/2020 | Schumacher et al. |
| 2020/0130645 A1 | 4/2020 | Srnec |
| 2020/0136504 A1 | 4/2020 | Schumacher et al. |
| 2020/0189361 A1 | 6/2020 | Radcliff |
| 2020/0207184 A1 | 7/2020 | Schumacher et al. |
| 2020/0231041 A1 | 7/2020 | Avrich et al. |
| 2021/0061156 A1 | 3/2021 | Swab |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| DE | 102014208015 | 10/2015 |
| EP | 0282051 | 9/1988 |
| EP | 1842758 | * 4/2006 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 2768693 | 5/2019 |
| EP | 536552 | 9/2019 |
| EP | 3540340 | 9/2019 |
| EP | 3536552 | 11/2019 |
| GB | 2551999 | 1/2018 |
| JP | 2000158930 | 6/2000 |
| JP | 2007320352 | 12/2007 |
| JP | 2009243780 | 10/2009 |
| JP | 5772439 | 9/2015 |
| JP | 2018-136090 | 8/2018 |
| JP | 2019145521 | 8/2019 |
| KR | 10-2012-0092834 | 8/2012 |
| SE | 541327 | 7/2019 |
| WO | 03038988 | 5/2003 |
| WO | 2008153518 | 12/2008 |
| WO | 2009155941 | 12/2009 |

(56) References Cited

FOREIGN PATENT DOCUMENTS

| | | |
|---|---|---|
| WO | 2010065476 | 6/2010 |
| WO | 2011066468 | 6/2011 |
| WO | 2011094099 | 8/2011 |
| WO | 2012138497 | 10/2012 |
| WO | 2012138500 | 10/2012 |
| WO | 2013075623 | 5/2013 |
| WO | 2013096084 | 6/2013 |
| WO | 2014002244 | 1/2014 |
| WO | 2014/058610 | 4/2014 |
| WO | 2014085672 | 6/2014 |
| WO | 2014106060 | 7/2014 |
| WO | 2014106068 | 7/2014 |
| WO | 2016038838 | 3/2016 |
| WO | 2016145107 | 9/2016 |
| WO | 2017058660 | 4/2017 |
| WO | 2017/083336 | 5/2017 |
| WO | 2017083333 | 5/2017 |
| WO | 2017151698 | 9/2017 |
| WO | 2017/172855 | 10/2017 |
| WO | 2017172484 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/009798 | 1/2018 |
| WO | 2018/017450 | 1/2018 |
| WO | 2018005957 | 1/2018 |
| WO | 2018009646 | 1/2018 |
| WO | 2018017818 | 1/2018 |
| WO | 2018029502 | 2/2018 |
| WO | 2018/204591 | 11/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https:/iepieleaks.nl/lamberet-smart-reefer-solutrans/.
U.S. Appl. No. 16/178,067, titled "Methods and Systems for Generation and Utilization of Supplemental Stored Energy for Use in Transport Climate Control", filed Nov. 1, 2018, 35 pages.
U.S. Appl. No. 16/565,063, titled "System and Method for Managing Power and Efficiently Sourcing a Variable Voltage for a Transport Climate Control System", filed Sep. 9, 2019, 59 pages.
U.S. Appl. No. 16/730,126, titled "Transport Climate Control System Power Architecture", filed Dec. 30, 2019, 27 pages.
U.S. Appl. No. 16/574,754, titled "Methods and Systems for Energy Management of a Transport Climate Control System", filed Sep. 18, 2019, 50 pages.
European Patent Application No. 18382672.6, titled "Methods and Systems for Energy Management of a Transport Climate Control System", filed Sep. 19, 2018, 50 pages.
European Patent Application No. 18382673.4 titled "Methods and Systems for Power and Load Management of a Transport Climate Control System", filed Sep. 19, 2018, 68 pages.
U.S. Appl. No. 16/176,802, titled "Methods and Systems for Controlling a Mild Hybrid System That Powers a Transport Climate Control System", filed Oct. 31, 2018, 31 pages.
U.S. Appl. No. 16/236,938, titled "Systems and Methods for Smart Load Shedding of a Transport Vehicle While in Transit", filed Dec. 31, 2018, 39 pages.
U.S. Appl. No. 16/176,720, titled "Methods and Systems for Augmenting a Vehicle Powered Transport Climate Control System", filed Oct. 31, 2018, 41 pages.
U.S. Appl. No. 16/176,602, titled "Reconfigurable Utility Power Input With Passive Voltage Booster", filed Oct. 31, 2018, 39 pages.
U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.
U.S. Appl. No. 16/235,865, titled "Methods and Systems for Preserving Autonomous Operation of a Transport Climate Control System", filed Dec. 28, 2018, 41 pages.
U.S. Appl. No. 16/574,775, titled "Methods and Systems for Power and Load Management of a Transport Climate Control System", filed Sep. 18, 2019, 68 pages.
U.S. Appl. No. 17/420,022, titled "Methods and Systems for Providing Predictive Energy Consumption Feedback for Powering a Transport Climate Control System", filed Jun. 30, 2021, 34 pages.
U.S. Appl. No. 17/420,037, titled "Methods and Systems for Providing Feedback for a Transport Climate Control System", filed Jun. 30, 2021, 37 pages.
U.S. Appl. No. 17/420,043, titled "Methods and Systems for Providing Predictive Energy Consumption Feedback for Powering a Transport Climate Control System Using External Data", filed Jun. 30, 2021, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution To Transport Climate Control Systems Amongst One or More Electric Supply Equipment Stations ", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,282, titled "Optimized Power Cord for Transferring Power To a Transport Climate Control System ", filed Sep. 9, 2019, 43 pages.
U.S. Appl. No. 16/565,235, titled "Interface System for Connecting a Vehicle and a Transport Climate Control System", filed Sep. 9, 2019, 64 pages.
U.S. Appl. No. 16/565,205, titled "Transport Climate Control System With an Accessory Power Distribution Unit for Managing Transport Climate Control Loads", filed Sep. 9, 2019, 57 pages.
U.S. Appl. No. 17/015,190, titled "Optimized Power Distribution To Transport Climate Control Systems Amongst One or More Electric Supply Equipment Stations ", filed Sep. 9, 2020, 43 pages.
U.S. Appl. No. 16/147,708, titled "Methods and Systems for Autonomous Climate Control Optimization of a Transport Vehicle", filed Sep. 29, 2018, 41 pages.
U.S. Appl. No. 16/176,667, titled "Drive Off Protection System and Method for Preventing Drive Off", filed Oct. 31, 2018, 41 pages.
U.S. Appl. No. 16/565,252, titled "Demand-Side Power Distribution Management for a Plurality of Transport Climate Control Systems", filed Sep. 9, 2019, 44 pages.
U.S. Appl. No. 17/015,194, titled "Prioritized Power Delivery for Facilitating Transport Climate Control", filed Sep. 9, 2020, 41 pages.

(56) References Cited

OTHER PUBLICATIONS

International Search Report and Written Opinion, issued in the PCT International Patent Application No. PCT/US2018/068129. dated Aug. 12, 2019, 13 pages.

* cited by examiner

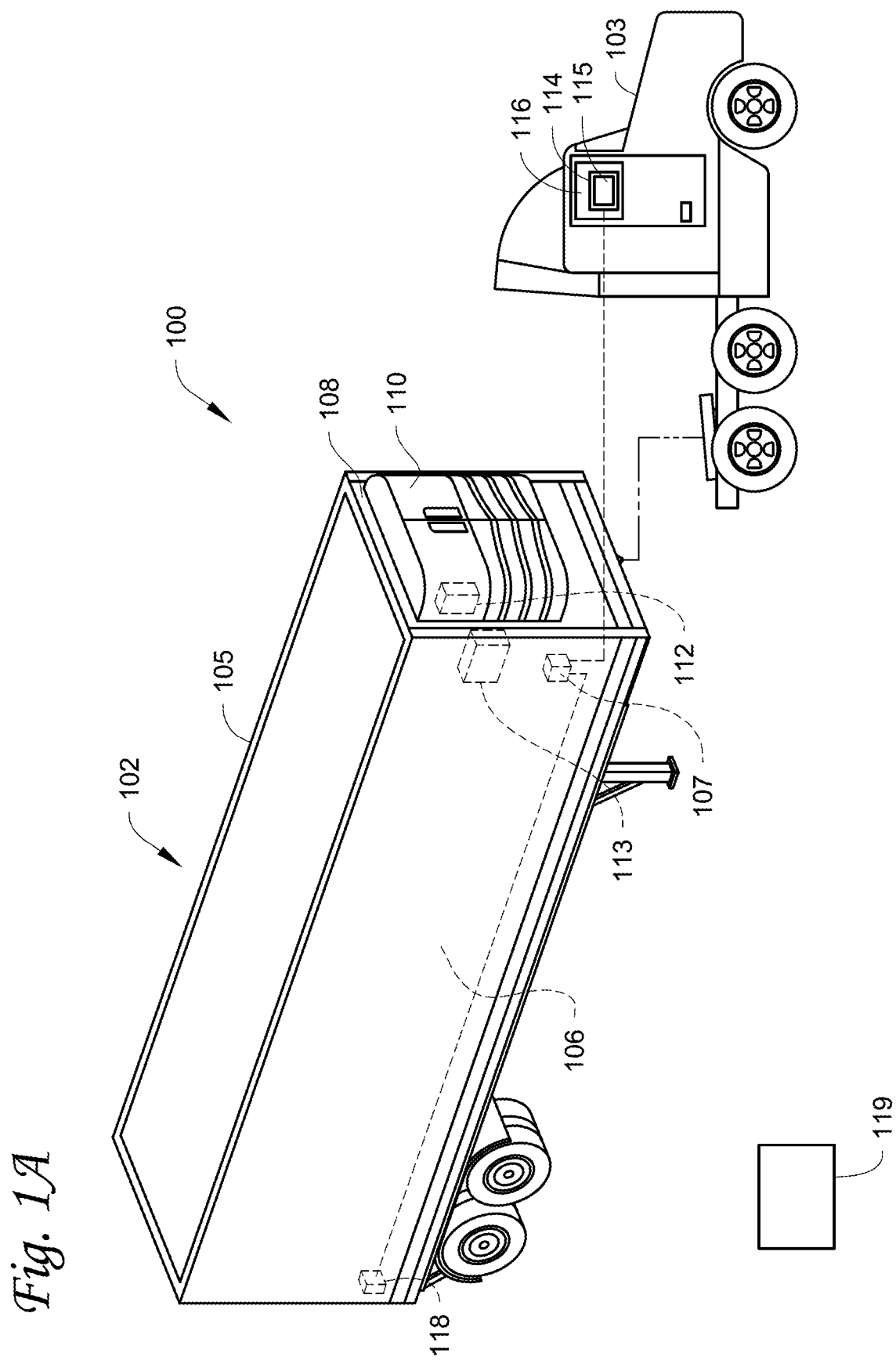

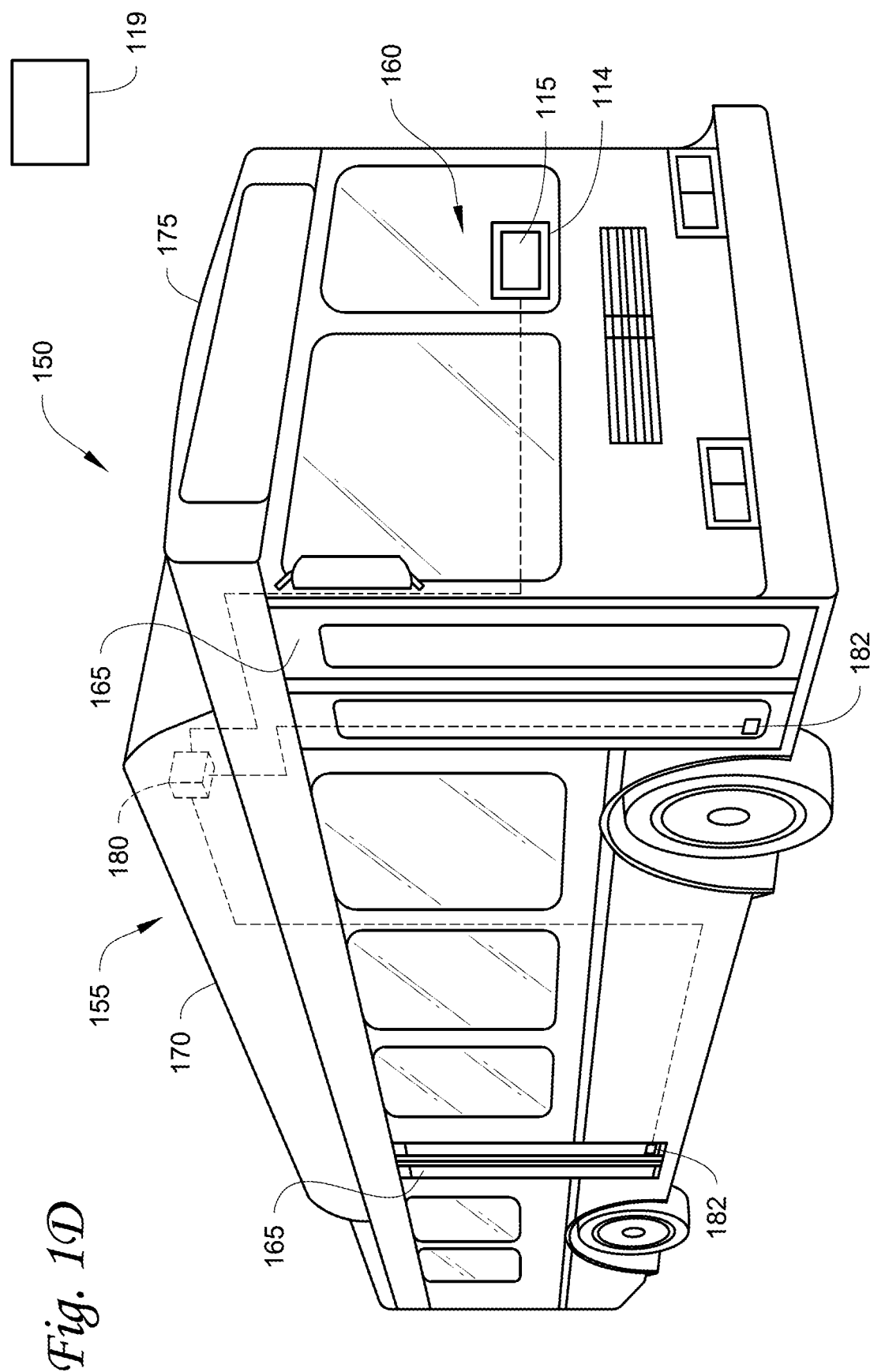

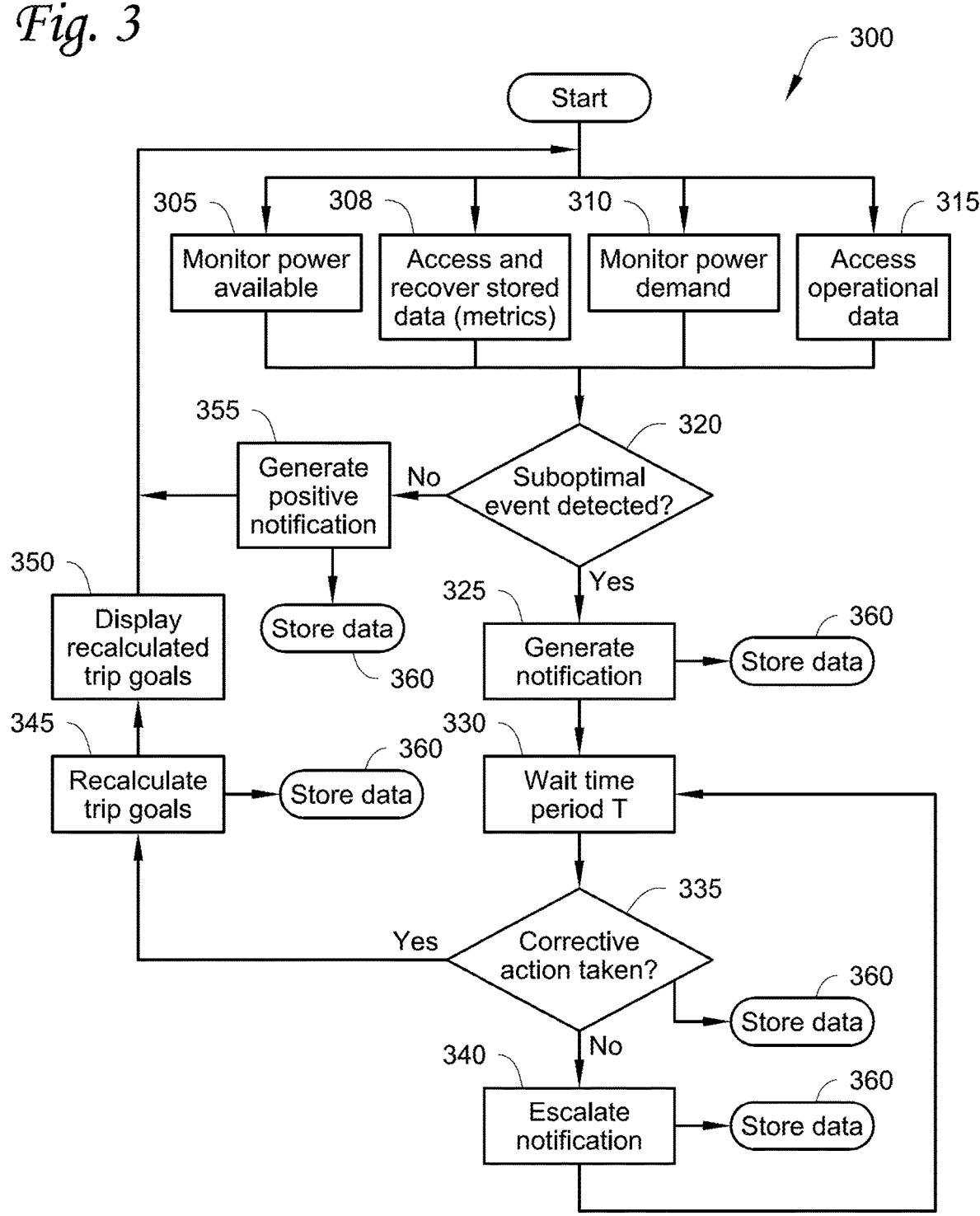

METHODS AND SYSTEMS FOR NOTIFYING AND MITIGATING A SUBOPTIMAL EVENT OCCURRING IN A TRANSPORT CLIMATE CONTROL SYSTEM

FIELD

Embodiments of this disclosure relate generally to a climate control system for a transport unit. More specifically, the embodiments relate to methods and systems for notifying and mitigating a suboptimal event occurring in a transport climate control system while in transit.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The TRS can maintain environmental condition(s) of the climate controlled space to maintain cargo (e.g., produce, frozen foods, pharmaceuticals, etc.). In some embodiments, the transport unit can include a HVAC system to control an environmental condition (e.g., temperature, humidity, air quality, etc.) within a passenger space of the vehicle.

SUMMARY

This disclosure relates generally to a climate control system for a transport unit. More specifically, the embodiments relate to methods and systems for notifying and mitigating a suboptimal event occurring in a transport climate control system while in transit.

The embodiments described herein can provide notification and corrective action during trip planning and during transit to optimize management of the transport climate control system. In some embodiments, one or more notifications can be displayed, for example, as one or more status lights that can be visible on a side of the transport unit (e.g., trailer), from a driver rear view mirror, a driver's smartphone, an infotainment system in the cab of the vehicle, etc. The one or more notifications can alert the driver when there may be issues with the transport climate control system. The one or more notifications can be provided in a variety of formats and/or a variety of alert levels to allow the driver to more efficiently manage available energy from a power system powering the transport climate control system and allow the driver to better plan their trip in order to increase the likelihood that there is sufficient energy to power the transport climate control system throughout the entire trip and/or the likelihood that the cargo is maintained at the required climate to avoid spoilage and/or damage. Also, the embodiments described herein can allow a driver to more adequately manage available energy for the transport climate control system and plan their trip to help increase the likelihood that the cargo can be maintained at the required climate during the duration of the trip.

The embodiments described herein can encourage that a climate controlled space of the transport unit is insulated from ambient conditions outside of the climate controlled space. This can minimize, for example, energy usage resulting from a transport climate control system using additional resources to reach or maintain desired climate setpoint conditions within the climate controlled space.

The embodiments described herein can encourage that the amount of energy that is lost during a particular stop along a route and the amount of time that a transport unit is at the particular stop along the route is minimized by, for example, displaying a recommended amount of time that should be spent at a particular stop, applying a countdown timer indicating the remaining amount of time that should be spent at the particular spot, providing a color coded notification (e.g., green, yellow, red) indicating successful adherence to the recommended amount of time that should be spent at the particular spot, etc.

The embodiments described herein can encourage that the amount of time that door(s) to the climate controlled space are open is minimized by, for example, displaying a maximum amount of time that door(s) to the climate controlled space should be opened, applying a countdown timer indicating the remaining amount of time that door(s) to the climate controlled space should be opened, providing a color coded notification (e.g., green, yellow, red) indicating successful adherence to the recommended amount of time that the door(s) to the climate controlled space should be opened, etc.

The embodiments described herein, can encourage an optimal airflow within the climate controlled space by generating a notification indicating a suboptimal airflow within the climate controlled space. The suboptimal airflow can be an airflow that is, for example, at an undesired temperature, travelling at an improper rate, etc.

The embodiments described herein can encourage that the amount of time for the transport unit to complete a route is minimized by, for example, displaying a total amount of route time left, displaying a total number of stops remaining, providing corrective actions to a driver if the remaining amount energy available for powering the transport climate control system is not sufficient to complete the route, etc.

The embodiments described herein can also store generated notifications and use previously stored notifications as metrics to judge future performance.

Accordingly, the embodiments described herein can manage and prevent waste of energy, particularly when there may be limitations to the amount of power available for the transport climate control system.

In one embodiment, a method for notifying and mitigating a suboptimal event occurring in a transport climate control system that provides climate control to a climate controlled space of a transport unit is provided. The method includes monitoring an amount of power available for powering the transport climate control system, monitoring a power demand from the transport climate control system, and accessing operational data of the transport climate control system and the transport unit. The method also includes a controller determining whether a suboptimal event is detected based on one or more of the monitored amount of power available, the monitored power demand and the accessed operational data. Also, the method includes the controller generating a notification when a suboptimal event is detected, and the controller instructing the generated notification to be displayed on a display.

In another embodiment, a suboptimal event notification and mitigation system for a transport climate control system that provides climate control to a climate controlled space of a transport unit, the system is provided. The system includes a climate control circuit, a display device, and a controller connected to the display device. The controller is configured to monitor an amount of power available for powering the transport climate control system, monitor a power demand from the transport climate control system, and access operational data of the transport climate control system and the transport unit. The controller is also configured to determine whether a suboptimal event is detected based on one or more of the monitored amount of power available, the monitored power demand and the accessed operational data. Also, the controller is configured to generate a notification when a suboptimal event is detected, and instruct the generated notification to be displayed on a display.

BRIEF DESCRIPTION OF THE DRAWINGS

References are made to the accompanying drawings that form a part of this disclosure and which illustrate embodiments in which the systems and methods described in this specification can be practiced.

FIG. 1A illustrates a perspective view of a climate controlled transport unit with a transport climate control system attached to a tractor, according to one embodiment.

FIG. 1D illustrates a perspective view of a passenger vehicle including a transport climate control system, according to one embodiment.

FIG. 3 illustrates a flowchart of a method for notifying and mitigating a suboptimal event occurring in a transport climate control system, according to one embodiment

DETAILED DESCRIPTION

Figure 1B:
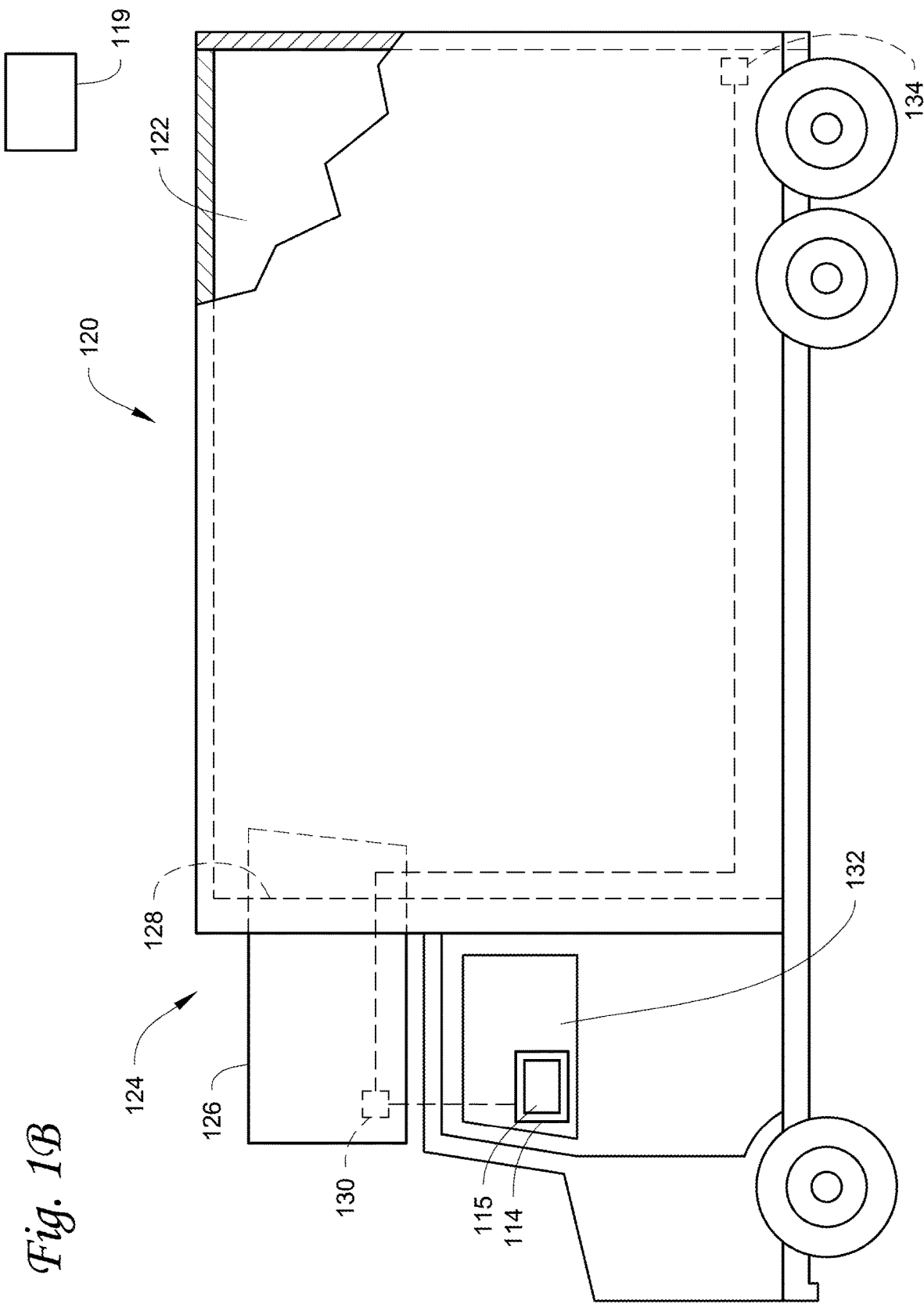
FIG. 1B illustrates a side view of a truck with a transport climate control system, according to one embodiment.

This disclosure relates generally to a climate control system for a transport unit. More specifically, the embodiments relate to methods and systems for notifying and mitigating a suboptimal event occurring in a transport climate control system while in transit.

FIG. 1A illustrates one embodiment of a climate controlled transport unit 102 attached to a tractor 103. The climate controlled transport unit 102 includes a transport climate control system 100 for a transport unit 105. The tractor 103 is attached to and is configured to tow the transport unit 105. The transport unit 105 shown in FIG. 1A is a trailer. It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The transport climate control system 100 includes a climate control unit (CCU) 110 that provides environmental control (e.g. temperature, humidity, air quality, etc.) within a climate controlled space 106 of the transport unit 105. The transport climate control system 100 also includes a programmable climate controller 107 and one or more sensors (not shown) that are configured to measure one or more parameters of the transport climate control system 100 (e.g., an ambient temperature outside of the transport unit 105, a space temperature within the climate controlled space 106, an ambient humidity outside of the transport unit 105, a space humidity within the climate controlled space 106, etc.) and communicate parameter data to the climate controller 107.

The CCU 110 is disposed on a front wall 108 of the transport unit 105. In other embodiments, it will be appreciated that the CCU 110 can be disposed, for example, on a rooftop or another wall of the transport unit 105. The CCU 110 includes a transport climate control circuit (see FIG. 2) that connects, for example, a compressor, a condenser, an evaporator and an expansion valve to provide conditioned air within the climate controlled space 106.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the transport climate control system 100 including the transport climate control circuit.

A human-machine interface (HMI) 114 may be included in a cabin 116 of tractor 103. The HMI includes a display 115 for displaying information to the driver. The HMI 114 may also include a user input such as, for example a, touch-screen, keypad, keyboard, track pad or ball, mouse, microphone configured to receive voice commands, or the like. In some embodiments, the HMI 114 can be, for example, a driver's smartphone, an infotainment system in the cabin 116, a telematics device connected to a central office, etc.

The HMI 114 can be configured to prompt a user for one or more operational parameters. The HMI 114 receives input of the one or more operational parameters via the user input. The one or more operational parameters may include, for example, climate control parameters, target goal parameters, route parameters, etc.

The climate control parameters can include, for example, cargo being stored in the climate controlled space 106, desired climate (e.g., temperature, humidity, air quality, etc.) setpoints within the climate controlled space 106. The driver can also provide feedback on cargo types (e.g., frozen cargo, fresh cargo, produce, pharmaceuticals, dry cargo, etc.).

The target goal parameters can include, for example, a total energy usage goal for the driver along a portion or the entire route, an energy usage rate goal (e.g., a miles per gallon (mpg) goal, a kW/min goal, etc. for the driver along a portion or the entire route), a total duration goal for a portion or the entire route, total driver break time amount goal for driver breaks along a portion or the entire route, total open door time goal for door opening events to the climate controlled space 106 along a portion or the entire route, open door time goal per stop for door opening events to the climate controlled space 106 along a portion or the entire route, etc. The driver can modify the target goal parameters when, for example, a load/cargo to the climate controlled space 106 is incorrectly loaded. This can modify the total open door time goal for door opening events.

The route parameters can include, for example, the duration of a route to be traveled by the transport unit, such as a shift length for the driver or an expected driving time for the route, a number of stops to be made along the route (e.g., a number of deliveries to be made by the transport unit, a number of stops along a passenger route, etc.), an average length of a door opening (e.g., loading and unloading times for deliveries, an average duration allowing passengers on or off at a stop, etc.). The route parameters can also include stops along the route for a driver to take a break when, for example, opportunity charging or utility power is available or is unavailable for a transport power system powering the transport climate control system 100. The driver can modify the route by adding or removing opportunities for charging the transport power system, adding or removing desired stops for a break, etc.

It will be appreciated that certain climate control parameters, target goal parameters, route parameters can be modified based on other climate control parameters, target goal parameters, route parameters. For example, route parameters indicating stops for charging the transport power system can be modified based on climate control parameters indicating the type of cargo being stored in the climate controlled space 106 as they can impact the energy use of the transport power system along the route.

The HMI 114 is operatively connected to the climate controller 107 so as to allow the HMI 114 and the climate controller 107 to communicate with each other. The operative connection may be wired or wireless communications, for example according to CanBUS, BLUETOOTH™, 802.11 WiFi, or other such standards and using corresponding hardware. For example, the climate controller 107 can be configured to receive the one or more operational parameters from the HMI 114. The HMI 114 and/or the climate controller 107 can include a telematics unit (not shown) that can communicate with a central office 119 via, for example, a wireless communication. In some embodiments, the central office 119 can send operational parameters to the climate controller 107 via the telematics unit. In some embodiments, the climate controller 107 and/or the HMI 114 can send a notification, status data, etc. to the central office 119. The HMI 114 and/or the climate controller 107 can also include a global positioning system (GPS) device or the like that can track a current and precise location of the transport unit.

The climate controlled transport unit 102 includes door sensor 118 located at a door (not shown) of the climate controlled space 106 and configured to determine whether the door (not shown) of climate controlled space 106 is open or closed. Door sensor 118 may be, for example, a mechanical, electrical, or optical sensor. Door sensor 118 may be in communication with the climate controller 107, for example, via a wired or wireless communication.

In some embodiments, the climate controlled transport unit 102 can also include one or more airflow sensors (not shown) that can detect an improper airflow over cargo stored in the climate controlled space 106. The airflow sensor(s) can monitor an airflow rate and/or temperature that can be used to determine whether there is an improper airflow. The airflow sensor(s) can be in communication with the climate controller 107, for example via a wired or wireless communication.

FIG. 1B depicts a temperature-controlled straight truck 120 that includes a climate controlled space 122 for carrying cargo and a transport climate control system 124. The transport climate control system 124 includes a CCU 126 that is mounted to a front wall 128 of the load space 112. The CCU 126 is controlled via a climate controller 130 to provide climate control within the climate controlled space 122. The CCU 126 can include, amongst other components, a transport climate control circuit (see FIG. 2) that connects, for example, a compressor, a condenser, an evaporator and an expansion valve to provide climate control within the climate controlled space 122.

The transport climate control system 124 also includes a programmable climate controller 130 and one or more sensors (not shown) that are configured to measure one or more parameters of the transport climate control system 124 (e.g., an ambient temperature outside of the truck 120, a space temperature within the climate controlled space 122, an ambient humidity outside of the truck 120, a space humidity within the climate controlled space 122, etc.) and communicate parameter data to the climate controller 130. The climate controller 130 is configured to control operation of the transport climate control system 124 including the transport climate control circuit.

The straight truck 120 includes a HMI 114 as described above with respect to FIG. 1A, that is located in the cabin 132 and operatively connected to the climate controller 130. The HMI 114 and/or the climate controller 130 can include a telematics unit (not shown) that can communicate with a central office 119 via, for example, a wireless communication. In some embodiments, the central office 119 can send operational parameters to the climate controller 130 via the telematics unit. In some embodiments, the climate controller 130 and/or the HMI 114 can send a notification, status data, etc. to the central office 119.

The straight truck 120 includes door sensor 134 located at a door (not shown) of the climate controlled space 122 and configured to determine whether the door (not shown) of climate controlled space 122 is open or closed. Door sensor 134 may be, for example, a mechanical, electrical, or optical sensor. Door sensor 134 is in communication with the climate controller 130, for example via a wired or wireless communication.

In some embodiments, the straight truck 120 can also include one or more airflow sensors (not shown) that can detect an improper airflow over cargo stored in the climate controlled space 122. The airflow sensor(s) can monitor an airflow rate and/or temperature that can be used to determine whether there is an improper airflow. The airflow sensor(s) can be in communication with the climate controller 130, for example via a wired or wireless communication.

Figure 1C:
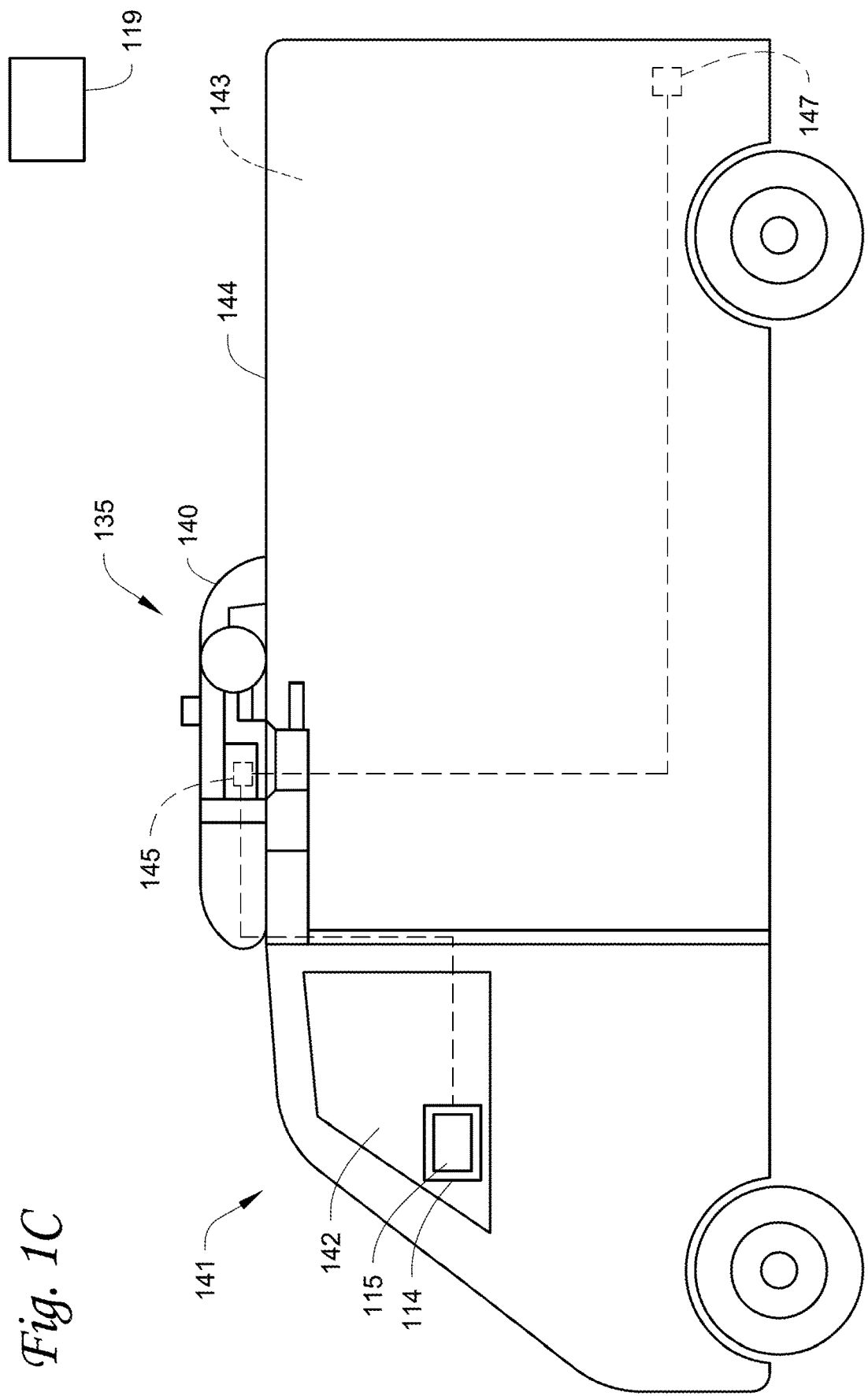
FIG. 1C illustrates a side view of a van with a transport climate control system, according to one embodiment.

FIG. 1C depicts a temperature-controlled van 141 that includes a climate controlled space 143 for carrying cargo and a transport climate control system 135 for providing climate control within the climate controlled space 143. The transport climate control system 135 includes a CCU 140 that is mounted to a rooftop 144 of the climate controlled space 143. The transport climate control system 135 can include, amongst other components, a transport climate control circuit (see FIG. 2) that connects, for example, a compressor, a condenser, an evaporator and an expansion valve to provide climate control within the climate controlled space 143.

The transport climate control system 135 also includes a programmable climate controller 145 and one or more sensors (not shown) that are configured to measure one or more parameters of the transport climate control system 135 (e.g., an ambient temperature outside of the van 141, a space temperature within the climate controlled space 143, an ambient humidity outside of the van 141, a space humidity within the climate controlled space 143, etc.) and communicate parameter data to the climate controller 145. The climate controller 145 is configured to control operation of the transport climate control system 135 including the transport climate control circuit.

The temperature controlled van 141 includes an HMI 114 that is located in a cabin 142 of the temperature controlled van 141. The climate controller 145 is in communication with the HMI 114. The HMI 114 and/or the climate controller 145 can include a telematics unit (not shown) that can communicate with a central office 119 via, for example, a wireless communication. In some embodiments, the central office 119 can send operational parameters to the climate controller 145 via the telematics unit. In some embodiments, the climate controller 145 and/or the HMI 114 can send a notification, status data, etc. to the central office 119.

The temperature controlled van 141 includes door sensor 147 located at a door (not shown) of the climate controlled space 143 and configured to determine whether the door (not shown) of climate controlled space 143 is open or closed. Door sensor 147 may be, for example, a mechanical, electrical, or optical sensor. Door sensor 144 is in communication with the climate controller 145, for example via a wired or wireless communication.

In some embodiments, the temperature controlled van 141 can also include one or more airflow sensors (not shown) that can detect an improper airflow over cargo stored in the climate controlled space 143. The airflow sensor(s) can monitor an airflow rate and/or temperature that can be used to determine whether there is an improper airflow. The airflow sensor(s) can be in communication with the climate controller 145, for example via a wired or wireless communication.

FIG. 1D is a perspective view of a vehicle 150 including a transport climate control system 155, according to one embodiment. The vehicle 150 is a mass-transit bus that can carry passenger(s) (not shown) to one or more destinations. In other embodiments, the vehicle 150 can be a school bus, railway vehicle, subway car, or other commercial vehicle that carries passengers. The vehicle 150 includes a climate controlled space (e.g., passenger compartment) 160 supported that can accommodate a plurality of passengers. The vehicle 150 includes doors 165 that are positioned on a side of the vehicle 150. In the embodiment shown in FIG. 1D, a first door 165 is located adjacent to a forward end of the vehicle 150, and a second door 165 is positioned towards a rearward end of the vehicle 150. Each door 165 is movable between an open position and a closed position to selectively allow access to the climate controlled space 160. The transport climate control system 155 includes a CCU 170 attached to a roof 175 of the vehicle 150.

The CCU 170 includes a transport climate control circuit (not shown) that connects, for example, a compressor, a condenser, an evaporator and an expansion device to provide conditioned air within the climate controlled space 160. The transport climate control system 155 also includes a programmable climate controller 180 and one or more sensors (not shown) that are configured to measure one or more parameters of the transport climate control system 155 and communicate parameter data to the climate controller 180. The climate controller 180 may comprise a single integrated control unit or may comprise a distributed network of climate controller elements. The number of distributed control elements in a given network can depend upon the particular application of the principles described herein. The climate controller 180 is configured to control operation of the transport climate control system 155 including the HVAC circuit.

The vehicle 150 includes a HMI 114 as described above with respect to FIG. 1A within the climate controlled space 160. The HMI can be viewable, for example, from the driver's seat (not shown). The climate controller 180 is in communication with the HMI 114. The HMI 114 and/or the climate controller 180 can include a telematics unit (not shown) that can communicate with a central office 119 via, for example, a wireless communication. In some embodiments, the central office 119 can send operational parameters to the climate controller 180 via the telematics unit. In some embodiments, the climate controller 180 and/or the HMI 114 can send a notification, status data, etc. to the central office 119.

The vehicle 150 includes door sensors 182, positioned, for example, at each of doors 165 and configured to determine whether any of doors 165 are open or closed. Door sensors 182 may be, for example, mechanical, electrical, or optical sensors. The door sensors 182 are in communication with the climate controller 180, for example via a wired or wireless communication.

In some embodiments, the vehicle 150 can also include one or more airflow sensors (not shown) that can detect an improper airflow over passengers located in the climate controlled space 160. The airflow sensor(s) can monitor an airflow rate and/or temperature that can be used to determine whether there is an improper airflow. The airflow sensor(s) can be in communication with the climate controller 180, for example via a wired or wireless communication.

Figure 2:
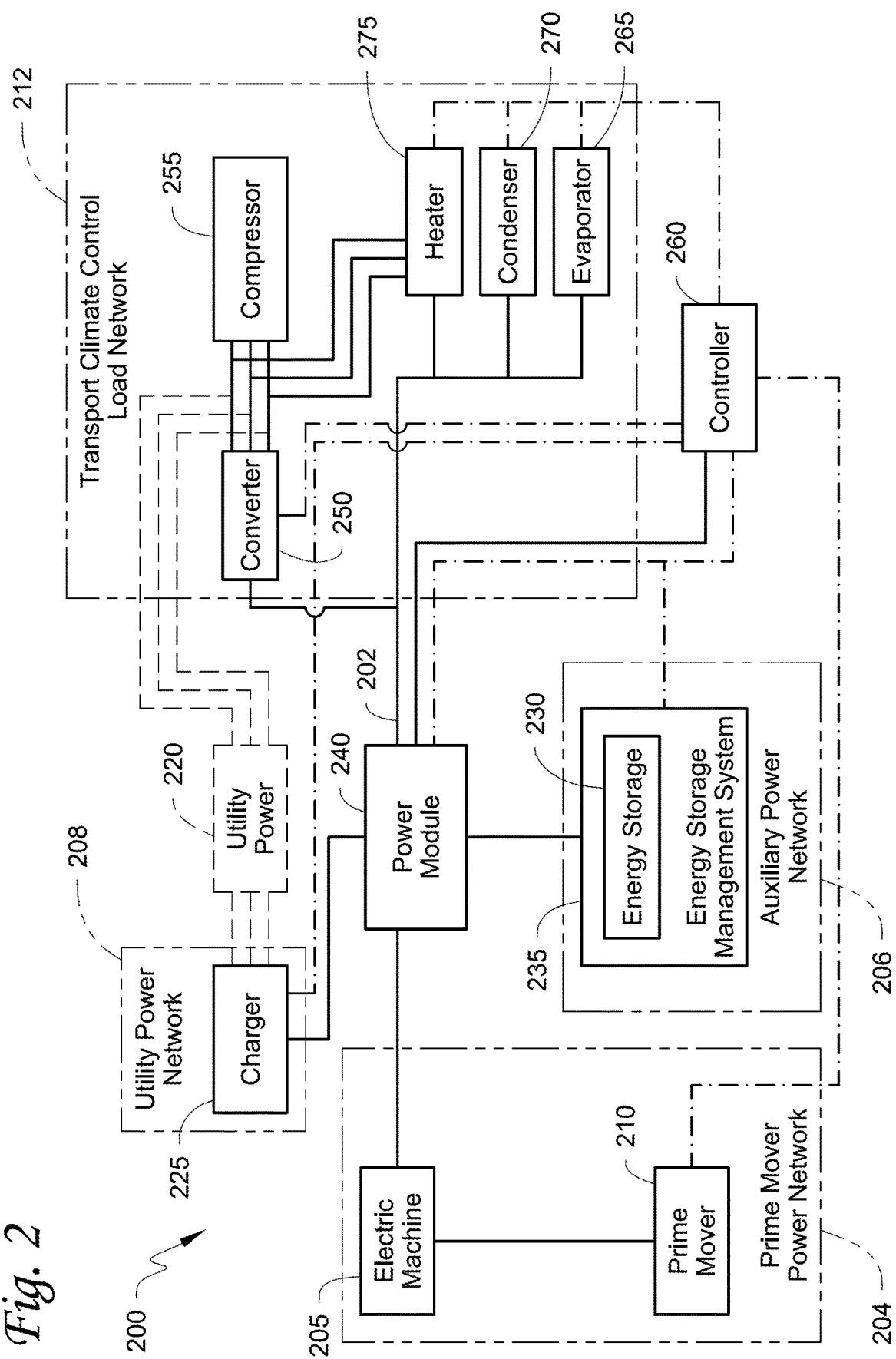
FIG. 2 illustrates a block diagram schematic of one embodiment of a power system for powering a transport climate control system, according to one embodiment.

FIG. 2 illustrates a block diagram schematic of one embodiment of a power system 200 for powering a transport climate control system. The power system 200 can power the transport climate control systems 100, 124, 135, 155 shown in FIGS. 1A-1D. The power system 200 includes a prime mover power network 204, an auxiliary power network 206, a utility power network 208, and a transport climate control load network 212 connected to a power conversion module 240. It will be appreciated that in some embodiments, the power system 200 can include one or more of the prime mover power network 204, the auxiliary power network 206, and/or the utility power network 208. For example, in one embodiment, the power system 200 only includes the prime mover power network 204, without the auxiliary power network 206 and/or the utility power network 208. In another embodiment, the power system 200 includes the prime mover power network 204 and the utility power network 208, without the auxiliary power network 206. The power system 200 can use one or more of the prime mover power network 204, the auxiliary power network 206 and the utility power network 208 at any given time to provide power to the transport climate control load network 212. While the power system 200 is configured to be a hybrid power system that is powered by the prime mover power network 204 in combination with the auxiliary power network 206 and/or the utility power network 208. However, it will be appreciated that the embodiments described herein can be used with a fully electric power system that does not include a prime mover or prime mover power network to provide power to the transport climate control system.

The prime mover power network 204 includes a prime mover 210 and an electric machine 205 that can provide electric power to the power conversion module 240. The prime mover 210 is configured to generate mechanical power and the electric machine 210 is configured to convert the mechanical power to electric power. The generated electric power is then sent by the prime mover power network 205 to the power conversion module 240. In some embodiments, the prime mover 210 can be a vehicle prime mover used to move the vehicle that also provides power to the transport climate control load network 212 when available. It will be appreciated that in these embodiments, mechanical power generated by the prime mover 210 that can be used in the system 200 can be inconsistent and based on operation and vehicle load requirements of the vehicle. In other embodiments, the prime mover 210 and the electric machine 205 can be part of a generator set that provides power to the transport climate control load network 212. In yet some other embodiments, the prime mover 210 and the electric machine 205 can be part of a CCU (e.g., the CCU 110, 126, 140, 170 shown in FIGS. 1A-D) to provide power to the transport climate control load network 212. It will be appreciated that in some embodiments the maximum power available from the prime mover power network 204 may never be sufficient to operate the transport climate control system operating at a full capacity.

In some embodiments, the electric machine 205 can be an electrical generator that can provide DC power to the transport climate control load network 212. In some embodiments, the electric machine 205 can include an alternator and a rectifier or an AC-DC converter (not shown) that rectifies or converts the AC power generated by the electric machine 205 to a DC power.

It will be appreciated that when the vehicle is an electric vehicle, there may be no prime mover 210. The electric machine 205 can be a motor generator that is used with a high voltage (e.g., in a range between 60V and 1500V; for example 400V, 800V, etc.) DC battery to run the vehicle. Electric vehicles can also provide a relatively high voltage (e.g., 400V, 800V, etc.) DC power source (e.g., a battery pack, a rechargeable energy storage system (RESS), etc.). Electric vehicles can include one or more DC-DC converters (e.g., two DC-DC convertors) to convert the relatively high voltage (e.g., 400V, 800V, etc.) to a low voltage (e.g., in a range between 0V and 60V; for example 12V). That is, the electric machine 205 can be replaced with a DC-DC converter having similar parameters as the electric machine 205 in order to be able to provide prime mover network power to the power conversion module 240.

In some embodiments, the electric machine 205 can provide a low voltage (e.g. 12V) from the prime mover power network 204 to the power conversion module 240 for powering the transport climate control load network 212. In some embodiments, an electric vehicle can provide for example, 7 kW-Hour energy from a 45 kW-Hour storage of the prime mover power network 204 to the power conversion module 240 to run the transport climate control load network 212. In some embodiments, the prime mover power network 204 can use take off power (e.g., electric power take off or ePTO) from the low voltage (for example, 12V) system for loads such as the power conversion module 240. The high voltage power can provide power for driving the vehicle (e.g., transmission power take off) and the power system 200 but may not take electric power from the high voltage system.

It will be appreciated that in a hybrid vehicle, there may be a machine (such as the electric machine 205) and/or a low voltage DC power source that can provide a low voltage (e.g., 12V) to the power conversion module 240.

It will be appreciated that any type of power source can provide power to the power system 200 and can be part of the prime mover power network 204. This can include, for example, the electric machine 205, a battery, a RESS, a generator, an axle-mounted generator, a power take off (PTO) device or ePTO device with an auxiliary converter, etc.

The auxiliary power network 206 includes an energy storage source 230 and an energy storage management system 235. In some embodiments, the auxiliary power network 206 can be part of the transport climate control system and potentially housed within a CCU. In other embodiments, the auxiliary power network 206 can be external to the transport climate control system and part of the prime mover power network 204. In yet some other embodiments, the auxiliary power network 206 can be external to the transport climate control system and external to the prime mover power network 204.

In some embodiments, the energy storage source 230 can include one or more batteries. For example, in one embodiment the energy storage source 230 can include two batteries (not shown). Each of the batteries can also be connected to the power conversion module 240. It will be appreciated that the energy storage source 230 can provide sufficient energy to power the transport climate control load network 212 by itself. In some embodiments, the energy storage source 230 can provide 12 VDC or 24 VDC. In other embodiments, the energy storage source 230 can provide 48 VDC.

The energy storage management system 235 is configured to monitor a charge level of one or more batteries of the energy storage source 230 and charge the one or more batteries of the energy storage source 230. The energy storage management system 235 can communicate with, for example, the controller 260 and/or a controller (not shown) of the power conversion module 240 to provide a charge level of one or more batteries of the energy storage source 230. Also, the energy storage management system 235 can receive instructions from, for example, the controller 260 and/or the controller of the power conversion module 240 indicating the amount of power from the energy storage source 230 should be supplied to the power conversion module 240.

It will be appreciated that in other embodiments, the energy storage management system 235 can be configured to monitor other parameters (e.g., monitor the fuel levels for an engine-driven system) and communicate the monitored data with, for example, the controller 260 and/or a controller (not shown) of the power conversion module 240.

The power conversion module 240 is configured to convert a power from both of the prime mover power network 204 and the auxiliary power network 206 to a load power compatible with one or more loads of the transport climate control load network 212. That is, the power conversion module 240 is configured to buck or boost power from the prime mover power network 204 and is configured to buck or boost power from the auxiliary power network 206 to obtain the desired load power. In some embodiments, the power conversion module 240 can include one or more DC/DC converters. For example, the power conversion module 240 can include one DC/DC converter to convert the power generated by the prime mover power network 204 and/or the auxiliary power network 206 to a voltage compatible with one or more loads of the transport climate control load network 212 and a second DC/DC converter to convert the auxiliary network power to a voltage compatible with one or more loads of the transport climate control load network 212. The converted power from the prime mover power network 204 and the converted power from the auxiliary power network 206 are combined to obtain a load power compatible with one or more loads of the transport climate control load network 212. The load power outputted by the power conversion module 240 can then be provided on a load DC bus 202 to the transport climate control load network 212. In some embodiments, the load power can be a low voltage DC power (e.g., between 0-60V DC). In other embodiments, the load power can be a high voltage DC power (e.g., between 60-1500V DC).

In some embodiments, the power conversion module 240 can include a controller (not shown) configured to monitor and control the power conversion module 240. In some embodiments, the controller can communicate with the controller 260.

The power system 200, and particularly the power conversion module 240, is controlled by the controller 260 of the transport climate control load network 212. The controller 260 can be, for example, the controller 107, 130, 145 and 180 shown in FIGS. 1A-D. In some embodiments, the power conversion module 240 can monitor the amount of current and/or voltage provided by the prime mover power network 204. Also, in some embodiments, the power conversion module 240 can monitor the amount of current and/or voltage drawn by components of the transport climate control load network 212. The power conversion module 240 can be configured to communicate the amount of current and/or voltage provided by the prime mover power network 204 and the amount of current and/or voltage drawn by components of the transport climate control load network 212.

Components of the transport climate control load network 212 can be, for example, part of a CCU that is mounted to the body of the vehicle (for example, truck, van, etc.). In some embodiments, the CCU can be above the cab of the truck (as shown in FIG. 1A). In another embodiment, the CCU can be on the top of the TU (for example, a top of a box where the external condensers are located) (see FIG. 1B). In some embodiments, the components of the transport climate control load network 212 can be DC powered components. In some embodiments, the components of the transport climate control load network 212 can be AC powered components. In some embodiments, the transport climate control load network 212 can include both DC powered components and AC powered components.

As shown in FIG. 2, the transport climate control load network 212 includes at least one compressor 255, one or more evaporator blowers 265, one or more condenser fans 270, the heater 275, and the controller 260. It will be appreciated that in some embodiments, the transport climate control load network 212 does not include the heater 275. It will also be appreciated that in some embodiments, the transport climate control load network 212 does not include the at least one compressor 255. It will further be appreciated that in some embodiments, the transport climate control load network 212 can include thermal management of batteries, power electronics, etc. The transport climate control load network 212 also includes an inverter 250 that is configured to boost the load power and convert the boosted load power to an AC load power. That is, the inverter 250 is configured to boost power from the DC load bus 202 and converts the power to AC power to drive the compressor 255. In some embodiments, the inverter 250 can convert the load power to a high voltage AC power. As shown in FIG. 2, the inverter 250 is configured to power the compressor 255 and optionally the heater 275. It will be appreciated that in other embodiments, the inverter 250 can power other components of the transport climate control load network 212 such as, for example, the one or more evaporator blowers 265, the one or more condenser fans 270, etc. In some embodiments, the inverter 250 can be a Compressor Drive Module (CDM).

In some embodiments, the inverter 250 can convert low voltage DC power (for example, 12 VDC, 24 VDC, 48 VDC) from the load DC bus 202 and provide AC power (for example, 230 VAC three phase, 460 VAC three phase, etc.) to drive the compressor 255. In particular, the inverter 250 drives the compressor 255 to meet demand of the transport climate control system. The load DC bus 202 is connected to and powers each of the inverter 250, the one or more evaporator blowers 265, the one or more condenser fans 270, the heater 275, and the controller 260. It will be appreciated that the inverter 250 with the compressor 255 can require the most power of the various loads of the transport climate control load network 212. As shown in FIG. 2, in some embodiments, the inverter 250 can also power the heater 275.

The utility power network 208 is configured to charge the energy storage source 230 of the auxiliary power network 206 when, for example, the vehicle is parked and has access to a utility power source 220. In some embodiments, the utility power network 208 can also provide power to operate the transport climate control load network 212 when, for example, the vehicle is parked and has access to a utility power source. The utility power network 208 includes the AC-DC converter 225. The utility power source (e.g., shore power, etc.) 220 can be connected to the AC-DC converter 225 to provide AC power input to the AC-DC converter 225. The AC-DC converter 225 is configured to convert the AC power from the utility power source 220 and to provide converted DC power to the power conversion module 240.

While FIG. 2 shows a single AC-DC converter 225, it is appreciated that in other embodiments the power system 200 can include two or more AC-DC converters. In embodiments where there are two or more AC-DC converters, each of the AC-DC converters can be connected to the utility power 220 to provide additional power capacity to the power system 200. In some embodiments, each of the AC-DC converters can provide different amounts of power. In some embodiments, each of the AC-DC converters can provide the same amount of power.

In some embodiments, the utility power 220 can be connected directly to the compressor 255 and provide power to drive the compressor 255 thereby bypassing the inverter 250. In some embodiments, the inverter 250 can be used as an AC-DC converter and convert power received from the utility power 220 into DC power that can be provided by the inverter 250 to the load DC bus 202.

In some embodiments, the compressor 255 can be a variable speed compressor. In other embodiments, the compressor 255 can be a fixed speed (e.g., two-speed) compressor. Also, in some embodiments, the heater 275 can be configured to receive power from the inverter 250. While the compressor 255 shown in FIG. 2 is powered by AC power, it will be appreciated that in other embodiments the compressor 255 can be powered by DC power or mechanical power. Further, in some embodiments, the prime mover 210 can be directly connected (not shown) to the compressor 255 to provide mechanical power to the compressor 255.

When the compressor 255 and/or the heater 275 are powered directly by the utility power 220, the compressor 255 and/or the heater 275 can be turned on and off (e.g., operate in a start/stop mode) in order to control the amount of cooling provided by the compressor 255 and/or the amount of heating provided by the heater 275.

The controller 260 is configured to monitor and control operation of the transport climate control system. In particular, the controller 260 can control operation of the compressor 255, the heater 275, the one or more condenser fans 270, the one or more evaporator blowers 265 and any other components of the vehicle powered transport climate control system. In some embodiments, the controller 260 can monitor the amount of power drawn by the components of the transport climate control load network 212. The controller 260 can also be configured to control the power system 200. The power system 200 can also include one or more sensors (not shown) that are configured to measure one or more power parameters (e.g., voltage, current, etc.)

throughout the power system 200 and communicate power parameter data to the controller 260.

FIG. 3 illustrates a flowchart of a method 300 for notifying and mitigating a suboptimal event occurring in a transport climate control system (e.g., the transport climate control systems 100, 124, 135, 155 shown in FIGS. 1A-1D), according to one embodiment. The transport climate control system can be powered by, for example, the power system 200 shown in FIG. 2. It will be appreciated that the method 300 can also be used with a fully electric power system that does not include a prime mover or prime mover power network to provide power to the transport climate control system.

The method 300 begins concurrently at 305, 308, 310 and 315. At 305, a controller (e.g., the climate controller 107, 130, 145 and 180 shown in FIGS. 1A-1D) monitors the amount of power available from a power system (e.g., the power system 200 shown in FIG. 2) that is powering the transport climate control system. In some embodiments, the controller can receive voltage and/or current data from one or more sensors provided within the power system to monitor the amount of power available from the power system.

At 308, the controller accesses and recovers stored metric data of previous suboptimal events. For example, the example, the stored metric data can include previous positive notifications that have been generated, previously recalculated trip goals, previous notifications that have been generated, whether previous corrective actions have been taken, previous escalated notifications generated, etc.

At 310, the controller monitors the amount of power demanded by the transport climate control system. In some embodiments, the controller can receive voltage and/or current data from one or more sensors provided within the transport climate control load network (e.g., the transport climate control load network 212) to determine the amount of power demanded by the transport climate control system. In some embodiments, the controller can receive voltage and/or current data from one or more sensors provided within the transport climate control load network (e.g., the transport climate control load network 212) to determine the amount of power demanded by the transport climate control system. In some embodiments, the controller can estimate the amount of power demanded by the transport climate control system by determining the operating mode of the transport climate control system (e.g., a continuous cooling mode, a cycle-sentry cooling mode, a heating mode, a defrost mode, a null mode, etc.) and/or based on how one or more components of the transport climate control load network (e.g., the compressor 255, the heater 275, the one or more evaporator fans 265, the one or more condenser fans 270, etc.) are currently operating.

At 315, the controller accesses operational data for the transport unit, the vehicle moving the transport unit, and the transport climate control system. The operational data can include, for example, climate control data for the transport climate control system, target goal data for the driver, route data for the transport unit, etc. In some embodiments, the operational data can be stored in memory portion of the controller. The operational data can include operational parameters received by, for example, a driver, a central office (e.g., the central office 119 shown in FIGS. 1A-D), etc. and can include current operational status data regarding how the driver, the transport unit, and/or the transport climate control system are currently or have been previously operating based on the operational parameters. For example, the operational data can include climate control parameters, target goals, route parameters, etc. Also, the operational data can include, for example, climate control status data, target goal status data, route parameter status data, etc. The climate control status data can include, for example, the type of cargo being stored in a climate controlled space of the transport unit (e.g., frozen cargo, fresh cargo, produce, pharmaceuticals, dry cargo, etc.), current climate conditions (e.g., temperature, humidity, air quality, etc.) within the climate controlled space, current ambient conditions (e.g., ambient temperature, ambient humidity, ambient air quality, etc.) outside of the transport unit and the climate controlled space, current operating mode of the transport climate control system, current operating status of one or more of a compressor, a heater, evaporator fan(s), condenser fan(s), valve(s), etc. of the transport climate control system, etc. The target goal status data can include, for example, a current total energy usage for the route, a current energy usage rate (e.g., a mpg average, a kW/min average, etc.) for the route, a current duration of the trip along the route, a current driver break time amount for the trip along the route, a current open door time for the trip along the route, a current open door time per stop average for the trip along the route, etc. The driver can modify the target goal parameters when, for example, a load/cargo to the climate controlled space 106 is incorrectly loaded. This can modify the total open door time goal for door opening events. The route status date can include, for example, a current position of the transport unit along the route, a current duration traveled by the transport unit along the route, a current number of stops made along the route, an average length of a door opening event, etc. The route parameters can also include stops along the route for a driver to take a break when, for example, opportunity charging or utility power is available or is unavailable for a transport power system powering the transport climate control system 100. The driver can modify the route by adding or removing opportunities for charging the transport power system, adding or removing desired stops for a break, etc.

While FIG. 3 illustrates that the controller can monitor the power available by the power system at 305, monitor the power demanded by the transport climate control system at 310, access and recover stored metric data at 308, and access the operational data at 315 concurrently, it will be appreciated that 305, 308, 310 and 315 can be performed sequentially with any of 305, 308, 310 and 315 being performed first, second, third or fourth. Once 305, 308, 310 and 315 are performed, the method 300 proceeds to 320.

At 320, the controller determines whether a suboptimal event has been detected based on the amount of power available to the transport climate control system monitored at 305, based on the amount of power demanded by the transport climate control system at 310, and based on the route data 315. One example of a suboptimal event can be an insufficient energy event whereby the controller determines that the power system is running out of energy and will not be able to power the transport climate control system throughout the entire trip under the current operating settings of the transport climate control system. Another example of a suboptimal event can be a predicted insufficient energy event whereby the controller determines that the power system is predicted to run out of energy and may not be able to power the transport climate control system throughout the entire trip under the current operating settings of the transport climate control system.

Yet another example of a suboptimal event can be a poor operation and/or improper use event whereby the controller determines that the transport climate control system is operating poorly or is being improperly used. Examples of the transport climate control system operating poorly can include, for example, the evaporator requiring a defrost, broken parts such as fan blades, plugged coils, bent/blocked ducts or orifices, a plugged filter, an improperly sealed door to the climate controlled space, etc. Examples of the transport climate control system being improperly used can include, for example, one or more doors to the climate controlled space being left open, poor loading of cargo into the climate controlled space (e.g., placing unfrozen cargo in a frozen zone of the climate controlled space, placing cargo against an evaporator blower and thereby impeding airflow within the climate controlled space, the transport unit being parked in a sunny location, operating the transport climate control system to a desired temperature setpoint that is not ideal for the cargo being stored or for passenger comfort in a bus (e.g., passenger compartment having a desired temperature setpoint of 60 degrees Fahrenheit), excessive use of accessories (e.g., liftgates) powered by the transport power system that can drain energy available to the transport climate control system, etc.

Also, another example of a suboptimal event can be when an unexpected change is detected (e.g., an operational setpoint of the transport climate control system is changed) when, for example, the transport unit is at a location that is outside of an authorized zone for the unexpected change to occur. Further, another example of a suboptimal event can be when an unexpected change in ambient condition (e.g., unexpected ambient temperature change, unexpected ambient humidity change, unexpected cloud coverage change, etc.) or elevation is detected that could, for example, prevent the power system from providing sufficient energy to the transport climate control system over the duration of the route to prevent damage or spoilage of cargo stored in the climate controlled space. It will be appreciated that the suboptimal event can occur while the transport climate control system is on the road or off the road (e.g., at a parking lot, a truck stop, a tarmac, a dock, a gravel lot, etc.) to ensure that the cargo is protected from spoilage and/or damage.

In some embodiments, a suboptimal event can be when one or more trip goals for the driver of the vehicle is not being met. One example of a trip goal can be the power system powering the transport climate control system throughout the entire trip under the current operating settings of the transport climate control system without requiring, for example, a stop for recharging a battery of the power system, etc. Another example of a trip goal can be minimizing the amount of time that a transport unit is at a particular stop along the route. Yet another example of a trip goal can be minimizing the amount of time that door(s) to the climate controlled space are open. Also, another example of a trip goal can be minimizing the amount of time for the transport unit to complete a route. The one or more trip goals can include moving as much cargo or passengers as possible. This can include maximizing the number of stops for unloading cargo and maximizing the amount of cargo unloaded at a stop. For example, it may be suboptimal to have a stop where only one box of cargo is being unloaded as the amount of energy used to make the stop may be more than the value in making the stop when there are other stops that have more cargo to be unloaded.

When a suboptimal event is detected, the method 300 proceeds to 325. When a suboptimal event is not detected, the method 300 proceeds to 355.

At 325, the controller generates a notification that can be accessed by, for example, a driver of the vehicle, a dispatch member at a remote site, a fleet manager managing a plurality of transport units, a logistics member at a remote site, a yard worker at a warehouse, etc. The notification can include a suggested corrective action for addressing the generated notification.

In some embodiments, the generated notification can include a color based notification. For example, the generated notification can be green to indicate that a suboptimal event has not occurred and/or no corrective action is required, yellow to indicate that a suboptimal event may be occurring or has the potential for occurring and/or that a corrective action is recommended, and red to indicate that a suboptimal event has occurred and/or a corrective action is mandatory.

In some embodiments, the generated notification can include a timer based notification. For example, the generated notification can provide a countdown, for example, until suboptimal event may occur, until a corrective action may be required, etc.

In some embodiments, the generated notification can identify opportunities for refreshing (e.g., recharging) an energy storage source of the power system. The notification can appear, for example, when the transport unit is near an energy supply. This type of notification could be provided immediately, when the transport unit is soon to reach the energy supply, or at a specific time or location. Accordingly, the energy supply can coordinate between multiple transport units passing by.

In some embodiments, the generated notification can be accessed by a driver via a display (e.g., the display 115 shown in FIGS. 1A-D) provided, for example, on a human-machine interface (HMI) (e.g., the HMI 141 shown in FIGS. 1A-D), an indicator device, etc. that displays a current status of the transport climate control system and other information to drive appropriate actions to ensure that the trip is successful (e.g., that there is sufficient energy to power the transport climate control system to avoid spoilage and/or damage of cargo throughout the entire trip).

Figure 4B:
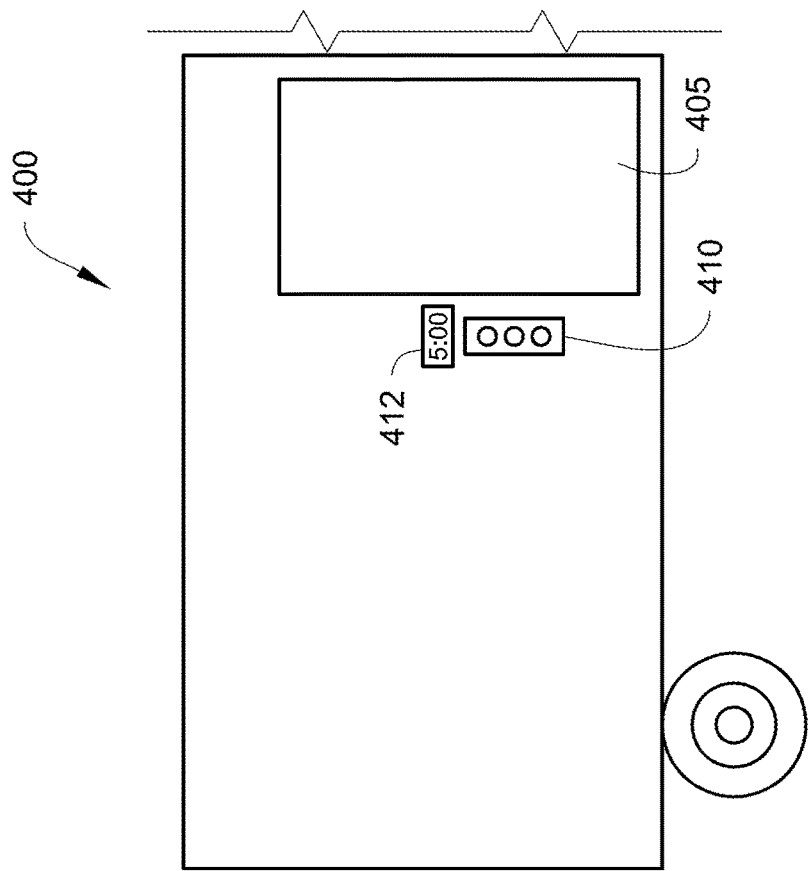
FIG. 4B illustrates a side view of a transport unit with a status display and timer, according to one embodiment.
Figure 4A:
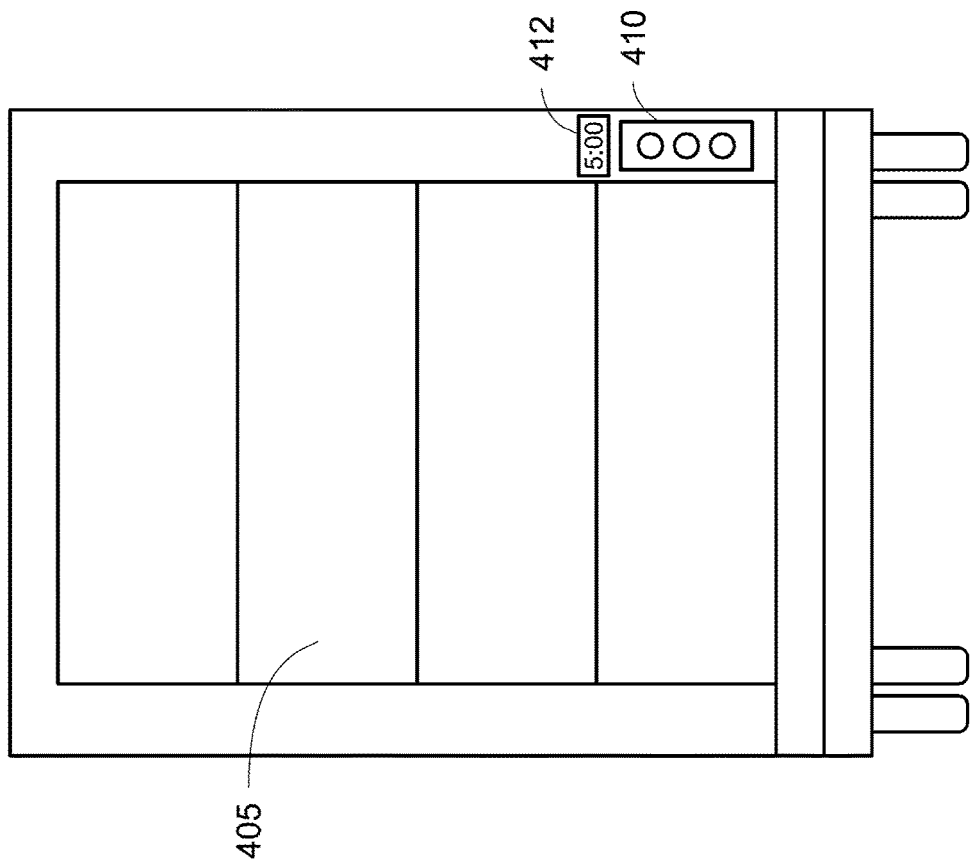
FIG. 4A illustrates a rear view of a transport unit with a status display and timer, according to one embodiment.

FIGS. 4A and 4B illustrate rear and side views of a transport unit 400 with a status display 410 and a timer 412 adjacent to a door 405, according to one embodiment. The status display can include for example, one or more lights that can provide the generated notification for display to a driver. The status display 410 can display, for example, a color based notification indicating, for example, a status of the door 405. The timer 412 can display, for example, a timer based notification for providing a countdown timer, for example, when the door 405 is opened.

Figure 5B:
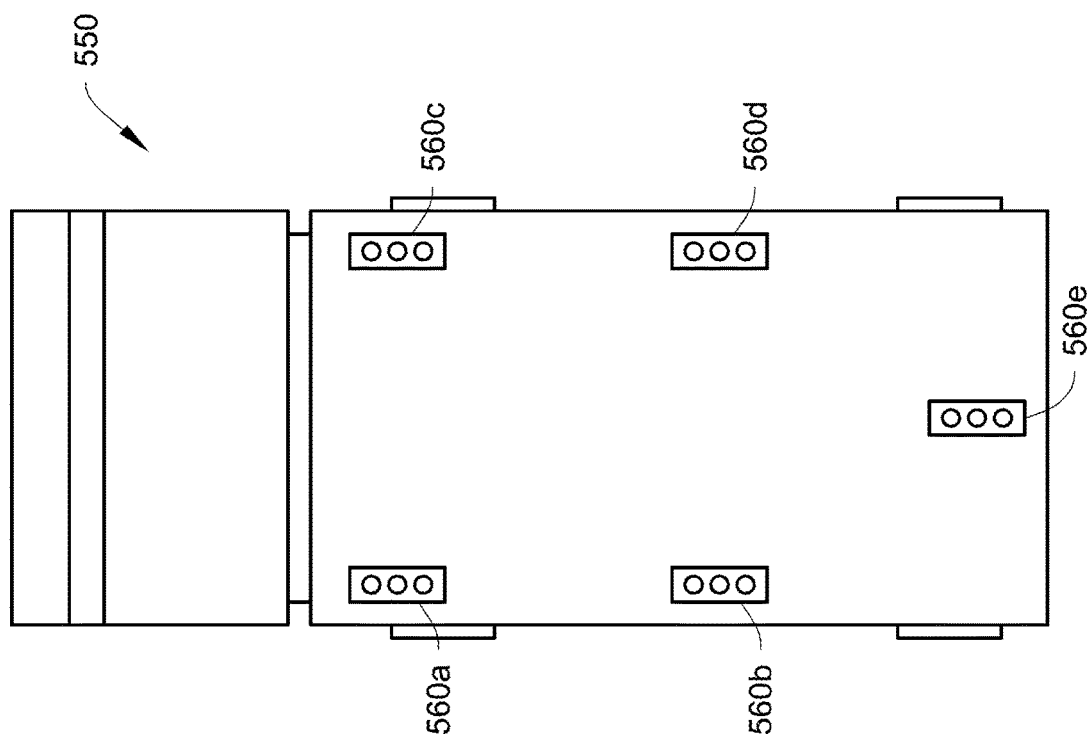
FIG. 5B illustrates a status display for a trailer, according to one embodiment.
Figure 5A:
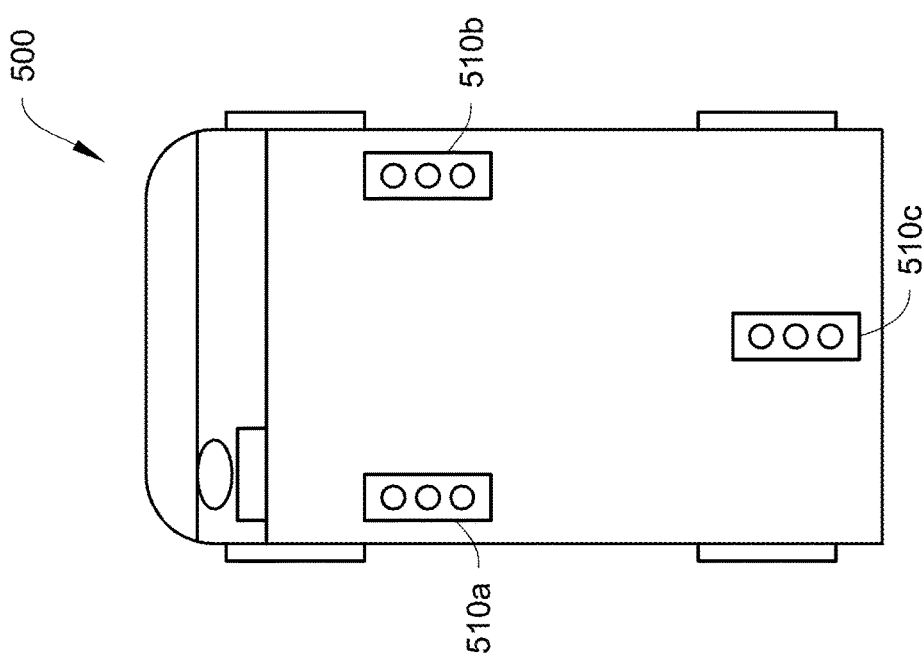
FIG. 5A illustrates a status display for a van or truck, according to one embodiment.

FIGS. 5A and 5B illustrate two different types of status displays 500, 550 that can be provided in a cab portion of the vehicle for use by the driver. As shown in FIG. 5A, the status display 500 illustrates a van or truck with multiple zone displays 510a, 510b, 510c. Each of the zone displays 510 can indicate a status for a different zone of the climate controlled space of the van or truck. Each of the zone displays 510a, 510b, 510c can display, for example, a color based notification indicating, for example, a status of a particular door with access to the particular zone of the climate controlled space. The zone displays 510a, 510b, 510c can also display, for example, a timer based notification for providing a countdown timer, for example, when a particular door with access to the particular zone is opened.

As shown in FIG. 5B, the status display 550 illustrates a tractor and trailer combination with multiple zone displays 560a-e. Each of the zone displays 560 can indicate a status for a different zone of the climate controlled space of trailer. Each of the zone displays 560a-e can display, for example, a color based notification indicating, for example, a status of a particular door with access to the particular zone of the climate controlled space. The zone displays 560*a-e* can also display, for example, a timer based notification for providing a countdown timer, for example, when a particular door with access to the particular zone is opened.

In some embodiments, the generated notification can be provided by a telematics unit to a central office (e.g., the central office 119 shown in FIGS. 1A-D) via, for example, a web based application, an email message, a short message service (SMS) message, etc.

In some embodiments, the generated notification can be accessed by, for example, the driver via a mobile device. In one example, the mobile device can provide a hands free profile that can enable setup of notifications that can be sent to a cab portion of the vehicle over, for example, Bluetooth hands free alerts, etc. In another example, the mobile device can access the generated notification via an application on the mobile device. In yet another example, the mobile device can access the generated notification via, for example, a SMS message, a mobile device alert, etc.

In some embodiments, the generated notification can be accessed by, for example, a navigation tool used, for example, by the driver while in transit. For example, the generated notification be in the form of an added stop along the route on the navigation tool for the driver to stop at along the route.

In some embodiments, the generated notification can be accessed, for example, by a vehicle driving the transport unit. In one example, the generated notification can be in the form of an interlock that can prevent the vehicle from moving, for example, when a door to the climate controlled space is open. In another example, the generated notification can be provided by a vehicle system to notify the driver that a corrective action is recommended or required. In yet another example, the generated notification can be accessed by, for example, a vehicle routing/navigation system used, for example, by the driver while in transit.

There are many types of corrective action that can be recommended by the generated notification. The corrective action suggested by the generated notification can be, for example, merely a recommendation to the driver, the central office, etc., or can be an automated change instructed by the controller to the transport unit, the transport climate control system, or the vehicle.

For example, a corrective action may be to make a route change for the current trip. The generated notification can recommend a route change corrective action when, for example, the suboptimal event detected is an unexpected change in ambient condition (e.g., unexpected ambient temperature change, unexpected ambient humidity change, unexpected cloud coverage change, etc.) or elevation. In another example, the corrective action suggested by the generated notification can be to suggest the driver to take a break or stop at a location where the power system can be refreshed as a corrective action when, for example, the suboptimal event detected is an insufficient energy event or a predicted insufficient energy event.

In another example, the corrective action suggested by the generated notification can be to change a desired climate setpoint for the climate controlled space to reduce energy usage when, for example, the suboptimal event detected is an insufficient energy event or a predicted insufficient energy event. This can include, for example, suggesting a desired temperature setpoint change from −20° F. to −5° F. when the cargo being stored is required to remain frozen so as to reduce the amount of energy required from the transport climate control system.

In another example, the corrective action suggested by the generated notification can be to change an operational window/deadband for maintaining a desired climate setpoint for the climate controlled space to reduce energy usage when, for example, the suboptimal event detected is an insufficient energy event or a predicted insufficient energy event. This can include, for example, suggesting a size increase of the operational window/deadband (e.g., from 5 degrees to 10 degrees) so as to reduce the amount of energy required from the transport climate control system. It will be appreciated that the operational window/deadband can be a range of values around a desired climate setpoint that the measured climate condition within the climate controlled space must fall outside of for the transport climate control system to turn on and use energy to reach the desired climate setpoint.

In another example, the corrective action suggested by the generated notification can be to control driver access to at least one of the transport unit, the transport climate control system, and the vehicle. This can include, for example, locking door(s) with access to the climate controlled space until the driver connects the power system for a refresh (e.g., recharge) when a cargo stored in the climate controlled space is at risk due to, for example, an insufficient energy event or a predicted insufficient energy event. This can also include, for example, automatically shutting door(s) with access to the climate controlled space to mitigate climate condition fluctuations within the climate controlled space. This can also include, for example, automatically creating an interlock event that prevents the vehicle from moving when door(s) with access to the climate controlled space are open.

In another example, the corrective action suggested by the generated notification can be to control airflow within the climate controlled space. This can include, for example, controlling evaporator fan(s) of the transport climate control system when, for example, door(s) with access to the climate controlled space are opened to reduce energy usage. This can also include, for example, moving movable air curtains provided within the climate controlled space to insulate a portion of the climate controlled space from a desired climate condition setpoint within the climate controlled space. This can also include, for example, adding/removing remote evaporators to aid in airflow being directed to optimize airflow surrounding the cargo. By controlling airflow within the climate controlled space as discussed above, the amount of energy utilized by the transport power system to power the transport climate control system can be decreased.

In another example, the corrective action suggested by the generated notification can be to optimize a size of the climate controlled space. This can include adjusting, for example, the location of insulated bulkheads within the climate controlled space. This can also include, for example, moving movable air curtains provided within the climate controlled space or moving evaporator fan(s) within the climate controlled space so as to change the size of the climate controlled space that is being climate controlled.

In another example, the corrective action suggested by the generated notification can be to modify operation of a defrost mode of the transport climate control system to optimize energy usage of the power system.

In another example, the corrective action suggested by the generated notification can be to request power from another power source that is not part of the power system.

In another example, the corrective action suggested by the generated notification can be to operate the transport climate control system in an "eco-mode" that reduces the amount of energy usage by the transport climate control system to reach the desired climate setpoints.

In another example, the corrective action suggested by the generated notification can be to add thermal mass (e.g., cold pallets, bags of ice, froze pallets, etc.) to the climate controlled system to assist in maintaining desired climate setpoints within the climate controlled space. This could be coordinated with a backhaul when the transport unit is passing a location where they can pick up frozen cargo.

In another example, the corrective action suggested by the generated notification can be to include an additional stop along the route where a utility power source is available for charging the transport power system.

The controller then stores the generated notification in memory at 360 and the method 300 then proceeds 330.

At 330, the controller waits a time period T after generating the notification. The time period T can based on the urgency of the suboptimal event detected at 320 and/or the urgency of the notification generated at 325. In some embodiments, the time period T can be based on, for example, one or more climate control parameters, target goal parameters, and route parameters. In one example, the time period T can be based on an average performance of door opening events and can be based on the amount of cargo being unloaded at a particular stop (e.g., 10 minutes per pallet of cargo being unloaded at a stop), etc. The method 300 then proceeds to 335.

At 335, the controller determines whether a corrective action has been taken to address the suboptimal event. The controller can monitor data obtained from one or more sensors in the transport unit, the transport climate control system and/or the transport power system to determine whether a corrective action has been taken. For example, the controller can determine whether a door to the climate controlled space has been closed based on door sensor data sent to the controller from door sensor(s) to the climate controlled space. In another example, the controller can determine that airflow within the climate controlled space has improved based on airflow sensor data sent to the controller from airflow sensor(s) in the climate controlled space. When the controller determines that a corrective action has not been taken, the controller stores that a corrective action was not taken in memory at 360 and the method 300 proceeds to 340. When the controller determines that a corrective action has been taken, the controller stores that a corrective action was taken in memory at 360 and the method 300 proceeds to 345.

At 340, the controller generates an escalated notification. For example, the controller can adjust a color based notification from green to yellow or from yellow to red. In another example, the escalated notification can be an alert sent to a driver's smartphone or to a central office. In another example, the escalated notification can include sending an interlock instruction to the vehicle to prevent the vehicle from moving until a corrective action is taken (e.g., preventing a tractor from moving when a door to the climate controlled space is left open). The controller then stores the generated escalated notification in memory at 360 and the method 300 then proceeds back to 330.

At 345, the controller recalculates one or more trip goals for the transport climate control system. In some embodiments, the controller can recalculate the one or more trip goals based on the amount of power available to the transport climate control system monitored at 305, the amount of power demanded by the transport climate control system monitored at 310, and the route data at 315. In some embodiments, the controller can also recalculate one or more trip goals based on one or more corrective actions taken at 335. For example, a recalculated trip goal can include reducing the number of stops made along the route to preserve energy for the transport climate control system. In another example, a recalculated trip goal can include adding a stop along the route at a location where there is a utility power source for recharging the transport power system. The controller then stores the recalculated trip goals in memory at 360 and the method 300 then proceeds to 350.

At 350, the controller displays one or more of the recalculated trip goals determined at 345. The recalculated trip goals can be displayed, for example, on an HMI, a smartphone, a telematics device connected to a central office, an infotainment system in the cabin of the vehicle, etc. The recalculated goals may be displayed, for example, as a new route plan with a revised number of stops, a rearranged stop order, an inclusion of charging/utility power operation, an elimination of all further stops, an emergency return (e.g., instructions to close all doors to the climate controlled space and return home), etc. The method then proceeds back to 305, 308, 310 and 315.

At 355, the controller generates a positive notification that can be accessed by, for example, a driver of the vehicle, a dispatch member at a remote site, a fleet manager managing a plurality of transport units, a logistics member at a remote site, a yard worker at a warehouse, etc. For example, the controller can adjust a color based notification from red to yellow or from yellow to green. For example, when a door to the climate controlled space is closed prior to a timer expiring, the positive notification can be a green flashing light provided on a status display. In some embodiments, the positive notifications can be aggregated along the route and can be displayed to the driver and to the central office. In some embodiments, a reward (e.g., monetary bonus) can be provided to the driver based on the number of positive notifications that are aggregated along the route as the customer can realize an increased profit for more efficient operation of the transport climate control system. The controller then stores the generated positive notification in a memory at 360 and the method 300 then proceeds back to 305, 308, 310 and 315.

Accordingly, the method 300 can provide notification and corrective action during trip planning and during transit to optimize management of the transport climate control system. The one or more generated notifications can be provided in a variety of formats and/or a variety of alert levels to allow the driver to more efficiently manage available energy from a power system powering the transport climate control system and allow the driver to better plan their trip in order to increase the likelihood that there is sufficient energy to power the transport climate control system throughout the entire trip and/or the likelihood that the cargo is maintained at the required climate to avoid spoilage and/or damage. Also, the method 300 can allow a driver to more adequately manage available energy for the transport climate control system and plan their trip to help increase the likelihood that the cargo can be maintained at the required climate during the duration of the trip.

The method 300 can also encourage that a climate controlled space of the transport unit is insulated from ambient conditions outside of the climate controlled space. This can minimize, for example, energy usage resulting from a transport climate control system using additional resources to reach or maintain desired climate setpoint conditions within the climate controlled space.

The method 300 can further encourage that the amount of time that a transport unit is at a particular stop along a route is minimized by, for example, displaying a recommended amount of time that should be spent at a particular stop, applying a countdown timer indicating the remaining amount of time that should be spent at the particular spot, providing a color coded notification (e.g., green, yellow, red) indicating successful adherence to the recommended amount of time that should be spent at the particular spot, etc.

Also, the method 300 can encourage that the amount of time that door(s) to the climate controlled space are open is minimized by, for example, displaying a maximum amount of time that door(s) to the climate controlled space should be opened, applying a countdown timer indicating the remaining amount of time that door(s) to the climate controlled space should be opened, providing a color coded notification (e.g., green, yellow, red) indicating successful adherence to the recommended amount of time that the door(s) to the climate controlled space should be opened, etc.

Moreover, the method 300 can encourage that the amount of time for the transport unit to complete a route is minimized by, for example, displaying a total amount of route time left, displaying a total number of stops remaining, providing corrective actions to a driver if the remaining amount energy available for powering the transport climate control system is not sufficient to complete the route, etc.

Aspects:

It is to be appreciated that any of aspects 1-6 can be combined with any of aspects 6-12.

Aspect 1. A method for notifying and mitigating a suboptimal event occurring in a transport climate control system that provides climate control to a climate controlled space of a transport unit, the method comprising:
monitoring an amount of power available for powering the transport climate control system;
monitoring a power demand from the transport climate control system;
accessing operational data of the transport climate control system and the transport unit;
a controller determining whether a suboptimal event is detected based on one or more of the monitored amount of power available, the monitored power demand and the accessed operational data;
the controller generating a notification when a suboptimal event is detected; and
the controller instructing the generated notification to be displayed on a display.

Aspect 2. The method of aspect 1, further comprising:
determining whether a corrective action is taken after the generated notification is displayed;
escalating the generated notification when it is determined that the corrective action has not been taken; and
instructing the escalated notification to be displayed on a display.

Aspect 3. The method of either one of aspects 1 and 2, further comprising:
determining whether a corrective action is taken after the generated notification is displayed;
recalculating a trip goal for a driver; and
the controller instructing the recalculated trip goal to be displayed on the display Aspect 4. The method of any one of aspects 1-3, wherein the operational data includes climate control data for the transport climate control system, target goal data for a driver, and route data for the transport unit.

Aspect 5. The method of any one of aspects 1-4, further comprising:
generating a positive notification when a suboptimal event is not detected; and
instructing the generated positive notification to be displayed on the display.

Aspect 6. The method of any of aspects 1-5, further comprising:
accessing stored metric data of previous suboptimal events; and
the controller determining whether the suboptimal event is detected based on one or more of the monitored amount of power available, the monitored power demand, the accessed operational data, and the stored metric data.

Aspect 7. A suboptimal event notification and mitigation system for a transport climate control system that provides climate control to a climate controlled space of a transport unit, the system comprising:
a climate control circuit including a compressor configured to provide climate control to the climate controlled space of the transport unit;
a display device; and
a controller connected to the display device, wherein the controller is configured to:
monitor an amount of power available for powering the transport climate control system,
monitor a power demand from the transport climate control system,
access operational data of the transport climate control system and the transport unit;
determine whether a suboptimal event is detected based on one or more of the monitored amount of power available, the monitored power demand and the accessed operational data;
generate a notification when a suboptimal event is detected; and
instruct the generated notification to be displayed on a display.

Aspect 8. The system of aspect 7, wherein the controller is further configured to:
determine whether a corrective action is taken after the generated notification is displayed,
escalate the generated notification when it is determined that the corrective action has not been taken, and
instruct the escalated notification to be displayed on a display.

Aspect 9. The system of either one of aspects 7 and 8, wherein the controller is further configured to:
determine whether a corrective action is taken after the generated notification is displayed;
recalculate a trip goal for a driver; and
instruct the recalculated trip goal to be displayed on the display.

Aspect 10. The system of any one of aspects 7-9, wherein the operational data includes climate control data for the transport climate control system, target goal data for a driver, and route data for the transport unit.

Aspect 11. The system of any one of aspects 7-9, wherein the controller is further configured to:
generate a positive notification when a suboptimal event is not detected, and
instruct the generated positive notification to be displayed on the display.

Aspect 12. The system of any one of aspects 7-11, wherein the controller is further configured to:
  access stored metric data of previous suboptimal events; and
  determine whether a suboptimal event is detected based on one or more of the monitored amount of power available, the monitored power demand, the accessed operational data, and the stored metric data.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for notifying and mitigating a suboptimal event occurring in a transport climate control system that provides climate control to a climate controlled space of a transport unit, the method comprising:
  monitoring an amount of power available for powering the transport climate control system;
  monitoring a power demand from the transport climate control system;
  accessing operational data of the transport climate control system and the transport unit, wherein the operational data includes climate control data for the transport climate control system and route data for the transport unit;
  a controller determining whether a suboptimal event is detected based on:
    the accessed operational data, including the climate control data for the transport climate control system and the route data for the transport unit; and
    one or more of the monitored amount of power available and the monitored power demand;
  the controller generating a notification when a suboptimal event is detected; and
  the controller instructing the generated notification to be displayed on a display,
  wherein the suboptimal event is one or more of an insufficient energy event, a predicted insufficient energy event, a poor operation and/or improper use event of the transport climate control system, an unexpected change in location of the transport unit, an unexpected change in a climate condition, and a trip goal for a driver is not being met.

2. The method of claim 1, further comprising:
  determining whether a corrective action is taken after the generated notification is displayed;
  escalating the generated notification when it is determined that the corrective action has not been taken; and
  instructing the escalated notification to be displayed on a display.

3. The method of claim 1, further comprising:
  determining whether a corrective action is taken after the generated notification is displayed;
  recalculating a trip goal for a driver based on the amount of power available for powering the transport climate control system, the power demand from the transport climate control system, and the route data; and
  the controller instructing the recalculated trip goal to be displayed on the display.

4. The method of claim 1, further comprising:
  generating a positive notification when a suboptimal event is not detected; and
  instructing the generated positive notification to be displayed on the display.

5. The method of claim 1, further comprising:
  accessing stored metric data of previous suboptimal events; and
  the controller determining whether the suboptimal event is detected based on one or more of the monitored amount of power available, the monitored power demand, the accessed operational data, and the stored metric data.

6. The method of claim 1, further comprising:
  determining that a corrective action is taken after the generated notification is displayed;
  recalculating a trip goal based on the corrective action taken,
  wherein the trip goal includes at least one of reducing a number of stops made by the transport unit along a route, and adding a stop along the route at a location of a utility power source for recharging a transport power system.

7. The method of claim 1, further comprising:
  waiting an adjustable time period after generating the notification, wherein the adjustable time period is set based on one or more climate control parameters, target goal parameters, and route parameters;
  determining whether a corrective action is taken after the generated notification is displayed and the adjustable time period has passed.

8. The method of claim 1, wherein the operational data further target goal data for a driver.

9. A suboptimal event notification and mitigation system for a transport climate control system that provides climate control to a climate controlled space of a transport unit, the system comprising:
  a climate control circuit including a compressor configured to provide climate control to the climate controlled space of the transport unit;
  a display device; and
  a controller connected to the display device, wherein the controller is configured to:
    monitor an amount of power available for powering the transport climate control system,
    monitor a power demand from the transport climate control system,
    access operational data of the transport climate control system and the transport unit, wherein the operational data includes climate control data for the transport climate control system and route data for the transport unit;
    determine whether a suboptimal event is detected based on:

the accessed operational data, including the climate control data for the transport climate control system and the route data for the transport unit; and one or more of the monitored amount of power available and the monitored power demand;

generate a notification when a suboptimal event is detected; and instruct the generated notification to be displayed on a display, wherein the suboptimal event is one or more of an insufficient energy event, a predicted insufficient energy event, a poor operation and/or improper use event of the transport climate control system, an unexpected change in location of the transport unit, an unexpected change in a climate condition, and a trip goal for a driver is not being met.

10. The system of claim 9, wherein the controller is further configured to:

determine whether a corrective action is taken after the generated notification is displayed, escalate the generated notification when it is determined that the corrective action has not been taken, and instruct the escalated notification to be displayed on a display.

11. The system of claim 9, wherein the controller is further configured to:

determine whether a corrective action is taken after the generated notification is displayed;

recalculate a trip goal for a driver based on the amount of power available for powering the transport climate control system, the power demand from the transport climate control system, and the route data; and instruct the recalculated trip goal to be displayed on the display.

12. The system of claim 9, wherein the controller is further configured to:

generate a positive notification when a suboptimal event is not detected, and instruct the generated positive notification to be displayed on the display.

13. The system of claim 9, wherein the controller is further configured to:

access stored metric data of previous suboptimal events; and determine whether a suboptimal event is detected based on one or more of the monitored amount of power available, the monitored power demand, the accessed operational data, and the stored metric data.

14. The system of claim 9, wherein the controller is further configured to:

determine that a corrective action is taken after the generated notification is displayed;

recalculate a trip goal based on the corrective action taken, wherein the trip goal includes at least one of reducing a number of stops made by the transport unit along a route, and adding a stop along the route at a location of a utility power source for recharging a transport power system.

15. The system of claim 9, wherein the controller is further configured to:

wait an adjustable time period after generating the notification, wherein the adjustable time period is set based on one or more climate control parameters, target goal parameters, and route parameters;

determine whether a corrective action is taken after the generated notification is displayed and the adjustable time period has passed.

16. The system of claim 9, wherein the operational data further target goal data for a driver.

17. A method for notifying and mitigating a suboptimal event occurring in a transport climate control system that provides climate control to a climate controlled space of a transport unit, the method comprising:

monitoring an amount of power available for powering the transport climate control system;

monitoring a power demand from the transport climate control system;

accessing operational data of the transport climate control system and the transport unit;

a controller determining whether a suboptimal event is detected based on:

the accessed operational data, including the climate control data for the transport climate control system and the route data for the transport unit; and and one or more of the monitored amount of power available and the monitored power demand;

the controller generating a notification when a suboptimal event is detected; and the controller instructing the generated notification to be displayed on a display, wherein the operational data includes climate control data for the transport climate control system and route data for the transport unit, and wherein the suboptimal event is one or more of a poor operation and/or improper use event of the transport climate control system, an unexpected change in location of the transport unit, an unexpected change in a climate condition, and a trip goal for a driver is not being met.

* * * * *